US010911750B2

(12) United States Patent
Zhao et al.

(10) Patent No.: US 10,911,750 B2
(45) Date of Patent: Feb. 2, 2021

(54) SYSTEM AND METHODS FOR FEEDBACK-BASED DATA TRANSMISSION

(71) Applicant: SZ DJI TECHNOLOGY CO., LTD., Shenzhen (CN)

(72) Inventors: Liang Zhao, Shenzhen (CN); Wenyi Su, Shenzhen (CN); Qingdong Yu, Shenzhen (CN); Wei Xiao, Shenzhen (CN); Lei Zhu, Shenzhen (CN); Ming Gong, Shenzhen (CN); Ning Ma, Shenzhen (CN); Wei Fan, Shenzhen (CN); Hao Cui, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/457,809

(22) Filed: Jun. 28, 2019

(65) Prior Publication Data

US 2019/0327463 A1 Oct. 24, 2019

Related U.S. Application Data

(63) Continuation of application No. PCT/CN2017/120225, filed on Dec. 29, 2017.

(30) Foreign Application Priority Data

Dec. 30, 2016 (WO) ................ PCT/CN2016/113899
Dec. 30, 2016 (WO) ................ PCT/CN2016/113944

(51) Int. Cl.
*H04N 19/164* (2014.01)
*H04N 19/172* (2014.01)
*H04N 19/103* (2014.01)

(52) U.S. Cl.
CPC ......... *H04N 19/103* (2014.11); *H04N 19/164* (2014.11); *H04N 19/172* (2014.11)

(58) Field of Classification Search
CPC .................................................... H04N 19/103
See application file for complete search history.

(56) References Cited

U.S. PATENT DOCUMENTS

| 8,737,475 B2 * | 5/2014 | Yan ...................... H04N 19/142 375/240.16 |
| 8,971,415 B2 | 3/2015 | He |

(Continued)

FOREIGN PATENT DOCUMENTS

| CN | 1115045 A | 1/1996 |
| CN | 101155311 A | 4/2008 |

(Continued)

OTHER PUBLICATIONS

The World Intellectual Property Organization (WIPO) International Searc Report and Written Opinion for PCT/CN2017/120225 dated Mar. 27, 2018 8 Pages.

(Continued)

*Primary Examiner* — Irfan Habib
(74) *Attorney, Agent, or Firm* — Anova Law Group, PLLC

(57) ABSTRACT

A computer-implemented method includes receiving a feedback message including feedback information from a receiver of image data, obtaining a current frame to be encoded, encoding the current frame based at least in part on the feedback information, and transmitting the encoded current frame to the receiver.

14 Claims, 13 Drawing Sheets

(56) References Cited

U.S. PATENT DOCUMENTS

| | | | |
|---|---|---|---|
| 9,071,484 B1* | 6/2015 | Truax | H04L 29/06027 |
| 9,106,936 B2* | 8/2015 | Wegener | H04N 21/2381 |
| 9,247,264 B2* | 1/2016 | Franche | H04N 19/172 |
| 9,338,473 B2 | 5/2016 | Zhao et al. | |
| 9,584,832 B2* | 2/2017 | Corey | H04N 19/105 |
| 10,147,329 B2* | 12/2018 | Liu | G08G 5/0026 |
| 10,313,685 B2* | 6/2019 | Lee | H04N 19/176 |
| 10,595,025 B2* | 3/2020 | Lee | H04N 21/6375 |
| 2005/0223333 A1 | 10/2005 | Yamamoto et al. | |
| 2008/0123775 A1 | 5/2008 | Abreu et al. | |
| 2011/0085602 A1* | 4/2011 | He | H04N 19/166 |
| | | | 375/240.25 |
| 2011/0122063 A1 | 5/2011 | Perlman et al. | |
| 2011/0126255 A1 | 5/2011 | Perlman et al. | |
| 2011/0249729 A1 | 10/2011 | Zhou et al. | |
| 2011/0268186 A1* | 11/2011 | Mukherjee | H04N 19/395 |
| | | | 375/240.07 |
| 2013/0028088 A1 | 1/2013 | Do et al. | |
| 2014/0086446 A1 | 3/2014 | Han et al. | |
| 2015/0156487 A1 | 6/2015 | Tao et al. | |
| 2016/0035224 A1 | 2/2016 | Yang et al. | |
| 2019/0334619 A1 | 10/2019 | Aoyama et al. | |

FOREIGN PATENT DOCUMENTS

| | | |
|---|---|---|
| CN | 101166270 A | 4/2008 |
| CN | 101193312 A | 6/2008 |
| CN | 101207823 A | 6/2008 |
| CN | 101360243 A | 2/2009 |
| CN | 102014286 A | 4/2011 |
| CN | 102075741 A | 5/2011 |
| CN | 102299784 A | 12/2011 |
| CN | 102510494 A | 6/2012 |
| CN | 102547266 A | 7/2012 |
| CN | 102684837 A | 9/2012 |
| CN | 102780547 A | 11/2012 |
| CN | 102946534 A | 2/2013 |
| CN | 101690202 B | 3/2013 |
| CN | 103168469 A | 6/2013 |
| CN | 104270181 A | 1/2015 |
| CN | 104660315 A | 5/2015 |
| CN | 104756398 A | 7/2015 |
| CN | 102484748 B | 9/2015 |
| CN | 105681342 A | 6/2016 |
| CN | 107005714 A | 8/2017 |
| CN | 107113441 A | 8/2017 |

OTHER PUBLICATIONS

The World Intellectual Property Organization (WIPO) International Search Report for PCT/CN2016/113899 dated Oct. 10, 2017 6 Pages.

Qiang Peng, Rate-Distortion Analysis for Feedback-Based Adaptive Reference Picture Selection, Journal of Electronics & Information Technology, Jun. 2009, p. 1455-1459, vol. 31 No. 6, School of Information Science & Technology, Southwest Jiaotong University, Chengdu, China.

The World Intellectual Property Organization (WIPO) International Search Report for PCT/CN2016/113944 dated Sep. 27, 2017 6 Pages.

* cited by examiner

SYSTEM AND METHODS FOR FEEDBACK-BASED DATA TRANSMISSION

CROSS-REFERENCE

This application is a continuation of International Application No. PCT/CN2017/120225, filed Dec. 29, 2017, which claims the benefit of priority to International Application No. PCT/CN2016/113944, filed Dec. 30, 2016, and International Application No. PCT/CN2016/113899, filed Dec. 30, 2016, the entire contents of all of which are incorporated herein by reference.

BACKGROUND

Unmanned aerial vehicles (UAVs) equipped with imaging devices are widely used to perform a variety of tasks such as surveillance and tracking, remote sensing, search and rescue, scientific research, and the like. However, low-latency transmission of image data such as videos and still images remains challenging in an environment with wireless and/or unreliable communication channels. In such an environment, data loss or decoding error of image frames can occur frequently, leading to deterioration of image quality and delay. A traditional approach for error recovery is to have a transmitter of data (e.g., UAV) periodically transmit intracoded frames (or I-frames), so that a receiver of the data (e.g., a remote terminal) does not need to rely on any other potentially missing or corrupt frames for decoding. However, in some cases, such an error recovery approach may not be timely enough to satisfy the requirement of low-latency system. Additionally, such an approach can increase the bitrate required to encode the frames, lower coding efficiency, and lead to inefficient channel usage.

SUMMARY

According to embodiments, a method is provided comprising receiving, from a receiver of image data, a feedback message comprising feedback information, obtaining a current frame to be encoded, encoding the current frame based at least in part on the feedback information, and transmitting the encoded current frame to the receiver.

According to embodiments, a method is provided comprising determining, at a receiver configured to receive image data transmitted from a transmitter, a receiving status with respect to the receiver, generating feedback information based at least in part on the receiving status, and transmitting the feedback information to the transmitter.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems, devices, and methods are provided for low-latency data transmission. In particular, a data transmitting terminal (also referred to as a transmitting terminal or transmitter) can be configured to encode frames based feedback information received from a data receiving terminal (also referred to as a receiving terminal or receiver). The feedback information can indicate a status with respect to data transmission at the receiver. For example, the feedback information may indicate that a received frame cannot be decoded successfully (e.g., due to transmission error or decoder malfunction). The feedback information can also include information that may be helpful for the transmitter to determine how to effectively recover from an error. For example, the feedback information may also include an identifier (e.g., a unique sequence number) of a frame that has been previously received and/or successfully decoded by the receiver. Depending on the feedback information, the transmitter can choose a suitable way to encode a current frame. For example, when the feedback information indicates an error, the transmitter can choose a suitable error recovery mechanism based on the feedback information and/or the current state at the transmitter. For example, the transmitter may determine whether to encode the current frame under an intraframe coding mode or an interframe coding mode. The transmitter may determine which reference frame to select to encode the current frame under the interframe coding mode.

Advantageously, the techniques described herein address some or all of the problems associated with existing techniques. In particular, the feedback information provided by the receiver allows the transmitter to encode frames in such a way as to respond effectively, efficiently, and timely to any errors without significant impact on performance and channel usage. For instance, instead of periodically transmitting intraframes as is done in traditional techniques, the transmitter can be configured to transmit the more efficiently encoded interframes most of the time and only transmit intraframes under limited circumstances, as guided by the feedback information.

Figure 1:
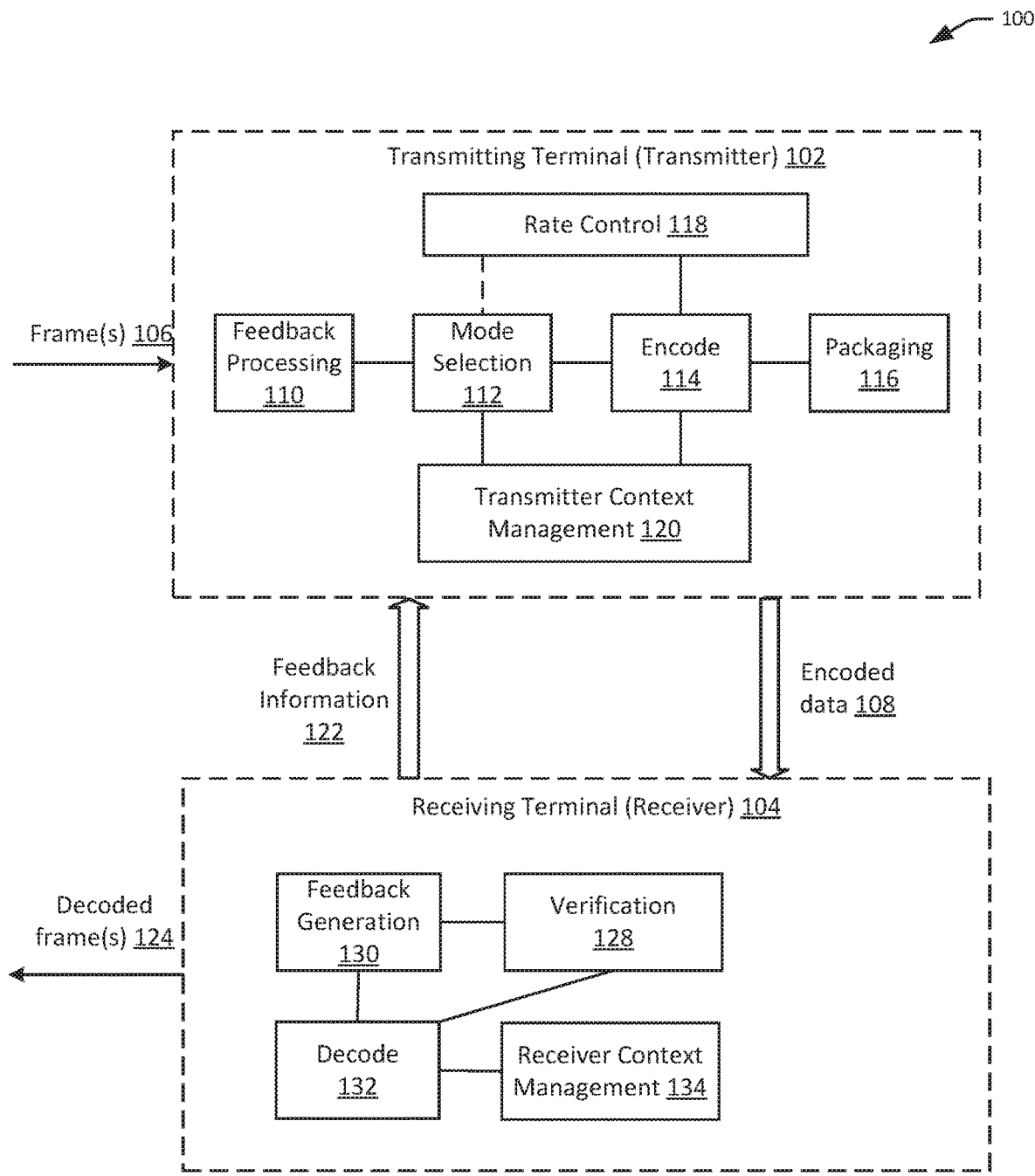
FIG. 1 illustrates an exemplary system for implementing feedback-based data transmission, in accordance with embodiments.

FIG. 1 illustrates an exemplary system 100 for implementing feedback based data transmission, in accordance with embodiments. The system 100 can comprise a transmitting terminal (also referred to as a transmitter) 102 and a receiving terminal (also referred to as a receiver) 104 that communicate with each other over one or more communication channels (not shown). The transmitter 102 can be configured to encode (e.g., compress) image frames 106, such as video frames and still image frames, and to transmit the resulting encoded data 108 to the receiver 104. The receiver 104 can be configured to decode (e.g., decompress) the encoded data 108 to generate reconstructed frames 124, for example, for playback or display purposes. The receiver 104 can also be configured to generate feedback information 122 based on the receiving status at the receiver 104, for example, with respect to the encoded data 108 and to transmit the feedback information 122 to the transmitter 102. The transmitter 102 can be configured to encode frames 106 based on the feedback information 122 from the receiver 104. In some embodiments, the communication channel used for transmitting the feedback information 122 (also referred to as the feedback channel) may or may not be the same as the communication channel used for transmitting the encoded data 108 (also referred to as the data channel).

In some embodiments, the transmitter 102 can be implemented on a movable object described herein (e.g., a UAV) and configured to receive the image frames 106 from one or more image capturing or image acquisition devices or systems such as cameras or video cameras, vision sensors, and the like, carried by such movable objects. The transmitter 102 may be a part of an image acquisition system. For example, the transmitter 102 and an image acquisition module may be enclosed in the same housing. Alternatively, at least a portion of the transmitter 102 may be separately located from the image acquisition device. For example, one or more components of the transmitter 102 may be located outside a housing for the image acquisition device. In some embodiments, the transmitter may include or be included in an image processing system.

In some embodiments, the transmitter 102 can comprise a feedback processing module 110, a mode selection module 112, an encoder 114, a packaging module 116, a rate control module (or rate controller) 118, and a transmitter context management module 120. Optionally, the transmitter 102 may be operably connected to or include a communication unit (not shown) configured to communicate with the receiver 104. These components can be implemented by one or more processors configured to implement executable instructions stored in non-transitory storage media. The one or more processors can include ARM processors, field-programmable gate arrays (FPGAs), application-specific integrated circuit (ASIC), central processing units (CPUs), graphics processing units (GPUs), and the like. In some embodiments, the components of the transmitter 102 may be implemented using hardware acceleration techniques.

The feedback processing module 110 can be configured to receive and process feedback information from the receiver. For instance, the feedback processing module 110 can be configured to extract data such as a status indicator and a frame identifier from a feedback message. The extracted data may be processed to determine whether an error has been detected at the receiver.

The mode selection module 112 can be configured to determine a mode for encoding a current frame (also referred to as an coding mode or a coding mode). In some embodiments, the mode selection module 112 can be configured to select from a plurality of coding modes comprising an intraframe coding mode (also referred to as "intraframe coding mode" or "intraframe mode"), an interframe coding mode using a short-term reference frame (also referred to as a "short-term interframe coding mode" or "short-term interframe mode"), and an interframe coding mode using a long-term reference frame (also referred to as a "long-term interframe coding mode" or long-term interframe mode").

Under an intraframe coding mode, a current frame is encoded by exploiting spatial redundancy, e.g., correlation among pixels, within the current frame. An intraframe coded frame is also referred to as an I-frame. For example, prediction values may be calculated by extrapolation from already coded pixels. An I-frame is encoded spatially without reference to any other frames. Under an interframe coding mode, a current frame is encoded by exploiting temporal redundancy between neighboring frames. For example, a current frame (also referred to as a P-frame or target frame) can be predicted from a reference frame that precedes it in a sequence of frames. The reference frame can itself be a P-frame or an I-frame. In some cases, the target frame may be intraframe encoded as well as interframe encoded. In other cases, the target frame may only be interframe encoded. A reference frame that immediately precedes the target frame is referred to as a short-term reference frame. Interframe encoding using a short-term reference frame is referred to as short-term interframe encoding or short-term interframe coding. A reference frame that does not immediately precede the target frame is referred to as a long-term reference frame. Interframe encoding using a long-term reference frame is referred to as long-term interframe encoding or long-term interframe coding.

The mode selection module 112 can be configured to determine a coding mode based at least in part on the feedback information 122. For example, the mode selection module 112 can be configured to receive the processing result from the feedback processing module 110. In some other embodiments, the feedback processing module 110 may be omitted and the mode selection module 112 may be configured to process the feedback information 122 directly.

In some embodiments, mode selection may be based at least in part on a difference between an identifier of the current frame to be encode and a reference frame identifier included in the feedback information. If the difference between the identifiers is less than or equal to a predetermined threshold value, then a short-term interframe mode may be selected. In other words, the current frame is interframe encoded using a short-term reference frame. Otherwise, an intraframe mode or a long-term interframe mode may be selected.

Additionally or alternatively, the mode selection may be based at least in part on transmitter context information. The transmitter context information may be managed by the transmitter context management module 120. In various embodiments, the transmitter context information can include interframe coding information, intraframe coding information, coding parameters, and any other state information related to the transmitter. For example, the context information may include a reference frame list that includes reference frames that are useful for encoding purposes. In some embodiments, the reference frame list can be implemented using a first-in-first-out (FIFO) queue, where a newly encoded frame is pushed to the head of the queue and the reference frame at the end of the queue is removed when a new frame is added. In various embodiments, any other suitable data structures can be used to implement the reference frame list, including a stack, a linked list, a table, a hierarchy, a tree, and the like.

In some embodiments, a sliding window mechanism can be used to control the size of the reference frame list. The sliding window can be updated (e.g., size increase/decrease, advanced forward) based on a variety of factors discussed herein. For example, the reference frame list may be cleared (e.g., setting the size of the sliding window to 0), when intraframe coding is required. As another example, after encoding a new frame, the reference frame list may be advanced forward to include the newly encoded frame. Frames at the end of the list may be removed to keep the size of the list less than or equal to a predetermined maximum size (e.g., 8 or 16).

In some embodiments, the head of the reference frame list is always used for encoding a current frame. In such embodiments, the reference frame list may be updated to insert or remove certain frames, so that the head of the list is the correct reference frame to use for encoding. For example, a long-term reference frame may be moved to the head of the list so it may be used for encoding the current frame. In other embodiments, the head of the reference frame list is not always used for encoding the current frame. In such embodiments, a pointer may be kept and updated to point to the reference frame which will be used for encoding the current frame. In some embodiments, an empty reference frame list means that the current frame will be intraframe encoded.

Optionally, the mode selection may be based at least in part on information provided by the rate control module 118. For example, the rate control module 118 may be configured to control a bitrate of the encoded image stream (e.g., by changing coding parameters such as quantization parameter), such that the resulting bitrate or resolution matches a current or expected channel condition or a specific use scenario. In some cases, a change in coding parameters from the rate control module indicates a change in bitrate, which requires selection of the intraframe coding mode.

The encoder 114 can be configured to encode a current frame (e.g., obtained from an image acquisition unit), based on the coding mode selected by the mode selection module 112 and/or the coding parameters provided by the rate control module 118.

Generally, the encoder is configured to receive input data (such as the image frames 106), encode the input data (such as the image frame 106), and provide output data comprising the encoded input data. The input data can include text, images, graphic objects, animation sequences, audio recordings, videos, or any other data that needs to be encoded. In some cases, the input data may include sensing data from one or more sensors such as vision sensors (e.g., cameras, infrared sensors), microphones, proximity sensors (e.g., ultrasound, lidar), position sensors, temperature sensors, touch sensors, and the like. In some cases, the input data may include input from a user such as biometric information including facial features, fingerprint scan, retina scan, voice recording, DNA samples, and the like.

Encoding of the input data may be necessary for efficient and/or secure transmission or storage of the data. Encoding of the input data can involve data compression, encryption, error encoding, format conversion, and the like. For example, multimedia data such as video or audio may be compressed to reduce the number of bits that are transmitted over the network. Sensitive data such as financial information and personally identifying information may be encrypted before being transmitted or stored to protect confidentiality and/or privacy.

Any suitable encoding techniques may be used to encode input data. The type of encoding applied may depend on the data to be encoded and specific encoding requirements. For example, lossy compression techniques (e.g., transform coding) may be used to encode multimedia data such as audio signals and image data (e.g., still images or video); whereas lossless compression techniques may be used to encode text and binary data (e.g., executable files). Audio signals may be compressed using audio compression methods and video data may be compressed using video compression methods. In some cases, the encoding of certain input data (e.g., financial data, medical or personal information) may be governed by established laws, regulations, or standards. Furthermore, available computing resources (e.g., CPU, memory, buffer capacity) and/or network environment (e.g., bandwidth, security) may affect the type of encoding that is performed. For instance, a server computer equipped with powerful CPUs may be configured to implement a relatively complex encoding algorithm, whereas a mobile device with limited computing resources may be configured to implement a relatively simple encoding algorithm. As another example, if the encoded data will be transmitted in a relatively secure environment (e.g., over a private or firewall-protected network), then the input data may be encrypted with an encryption algorithm that has a relatively low security level. On the other hand, if the encoded data will be transmitted in a less secure environment (e.g., over the Internet), then the input data may be encrypted with an encryption algorithm that has a relatively high security level.

In some embodiments, the encoder 114 may implement one or more different codecs. Each of the one or more codes may comprise codes, instructions or computer programs that implement different encoding algorithms. A suitable codec may be selected to encode a given set of input data based on various factors such as discussed above, including the types and/or sources of input data, the receiving entities of the encoded data, availability of computing resources, network environment, business requirements, regulations and standards, and the like.

In an example, an encoder may be configured to encode a series of video frames. Data in each frame may be encoded using a series of steps. The encoding may be based entirely on spatial information contained within a frame (e.g., an intra frame or I frame). In such embodiments, the encoding steps may include a transform step, a quantization step, and an entropy encoding step. During the transform step, the raw input data is transformed to a different domain (e.g., spatial frequency domain) suitable for the data content of the input data (e.g., video). Any suitable transform coding techniques may be used including Fourier-type transforms such as discrete cosine transform (DCT) or modified DCT. Using DCT as an example, a DCT matrix is determined based on a size of the data unit. The data unit may include a block of 4×4 or 8×8 pixels, a macroblock of 16×16 pixels, or any suitable set of data. The DCT matrix is then applied to the data unit using matrix multiplication, yielding a transformed matrix comprising transform coefficients.

In the quantization step, the coefficients in the transformed matrix may be quantized, for example, by dividing each coefficient by a corresponding element in a quantization matrix, and then rounding to the nearest integer value. The quantization matrix may be derived using a quantization parameter (also referred to as a quantization index). For example, the quantization parameter may be the value for each element of the quantization matrix. As another example, some or all of the elements in the quantization matrix may be multiplied (scaled) by the quantization parameter and the scaled quantization matrix may be used to quantize the transformed matrix. The quantization parameter may be an integer within a certain range (e.g., between and including 0 and 128). Typically, the higher the value of the quantization parameter, the larger the quantization step size is and the larger the element values are in the quantization matrix. This causes more transform coefficients to be quantized to zero or near-zero, which means that less bits would be required to encode the quantized coefficients. The more zero or near-zero coefficients there are, the less bits are required to encode the coefficients, resulting in lower bit size (and hence lower bitrate) for the data unit represented by the coefficients. The opposite is also true, that is, a lower value of a quantization parameter corresponds to a smaller quantization step size, a greater number of bits required to encode the quantized coefficients, and a higher bit size (and hence higher bitrate) for the data unit encoded using the quantization parameter. Techniques are provided herein for controlling the bitrate of the encoded input data by varying the quantization parameters used to encode portions of the input data.

In the entropy encoding step, the quantized coefficients in a quantized matrix are scanned in a predetermined order and encoded using any suitable coding technique. Since most of the non-zero DCT coefficients are likely concentrated in the upper left-hand corner of the matrix, a zigzag scanning pattern from the upper left to the lower right is typical. Alternative scanning order such as a raster scan may be used. The scanning order may be used to maximize the probability of achieving long runs of consecutive zero coefficients. The scanned coefficients can then be encoded using run-length encoding, variable-length encoding, or any other entropy encoding techniques, to generate the output data.

The above-described encoding process can be used to encode intra frames (I frames) based primary on spatial information contained within the intra frames. Additionally or alternatively, the encoder may be configured to exploit temporal redundancy between the frames and encode inter frames (e.g., P frames or B frames) based on forward and/or backward predictions made from previous or subsequent frames. In such embodiments, the encoding steps may include a prediction step, a transform step, a quantization step, and an entropy encoding step. In the prediction step, a frame may be forward and/or backward predicted based on a previous frame and/or a subsequent frame by estimating motion of the camera and/or objects in the video. Any suitable motion estimation techniques may be used to determine the motion vectors between adjacent frames, including pixel based methods (e.g., block-matching) and feather based methods (e.g., corner detection). If an acceptable match of a corresponding data unit (e.g., macroblock) is not found, then the encoder may encode the data unit as an intra data unit, as described above. Otherwise, the predicted frame may be subtracted from its reference and the residual error frame may be generated. The data included in the residual error frame may be spatially encoded in a similar fashion as for an intra frame, as described above. For example, one or more data matrices of the residual error frame may be transformed (e.g., using DCT) and quantized. The quantized transform coefficients of the residual error frame, the motion vectors or the difference between motion vectors of adjacent frames, along with any other suitable data needed to reconstruct the frame may be entropy encoded. As in intra encoding, the bitrate of the encoded data may be controlled at least in part by a quantization parameter provided by a rate controller.

The rate control module 118 (also referred to as the rate controller) can be configured to control a bitrate of the output encoded data by controlling the coding parameters (also referred to as rate control parameters) used by the encoder 114. The bitrate may be controlled to be within a certain range (e.g., no more than a maximum bitrate, no less than a minimum bitrate) or close to a target average bitrate. Alternatively, the bitrate may be controlled to vary depending on the complexity of the frames, bandwidth limit, buffer capacity, and other factors. In some cases, rate control may be enforced at one or more levels such as groups of pictures (GOP) level, frame level, slice level, macroblock level, block level, pixel level, and the like.

The coding parameters can include one or more quantization parameters for controlling the quantization step of the encoding process and hence the bitrate of the resulting output data. The quantization parameters may include, for example, a quantization step size, a value indicative of or related to a quantization step size such as a QP used in H.264 or similar encoders, a quantization matrix or a reference thereof, and the like. The coding parameters may include parameters for controlling other aspects of the encoding process such as the prediction step, the transform step, and/or the entropy encoding step. For instance, coding parameters may include a cutoff index used for removing certain high frequency coefficients before the coefficients are entropy encoded. Other examples of the coding parameters may include bit allocation information (e.g., maximum, minimum, or target bits allocated for encoding a data unit), a frame rate, a size of a data unit to be transformed and quantized, motion detection thresholds used to determine whether to code or skip coding a data unit (e.g., macroblock), Lagrange multiplier used in rate distortion optimization, algorithms and parameters used for the prediction, transform, and/or entropy encoding steps, and the like.

The rate controller may be configured to control rate (e.g., by providing the code parameters) based at least in part on output information about the output data from the encoder. The output information may be provided by the encoder or optionally derived by the rate controller based on the output data. The output information may include, for example, a number of bits used to encode a data unit (e.g., a frame, a slice, a macroblock), parameters (including algorithms) used to encode the data unit, encoder resource information (e.g., CPU/memory usage, buffer usage), and the like. Such information may be used by the rate controller to adjust one or more coding parameters (e.g., a quantization parameter) for one or more subsequent data units.

The rate controller may optionally be configured to control rate based at least in part on input information about the input frames. Input information may include any characteristics of the input data that may be useful for rate control, such as resolution, size, image complexity, texture, luminance, chrominance, motion information, and the like. For example, highly complex input data may be encoded with a higher bitrate than less complex input data.

In some embodiments, the rate controller may be configured to control rate based on one or more rate control threshold parameters. The values of the threshold parameters may be predefined and/or dynamically updated by a user, a system administrator, the rate controller, or any other component or device. The rate control threshold parameters may be used to derive coding parameters. In some embodiments, the threshold values used to determine the coding parameters for encoding a given slice may vary depending on an encoding order of the slice relative to other slices of a frame.

In some embodiments, the rate controller 118 may be configured to control rate based on additional information. Such information may include decoder information from an entity configured to receive, decode, and/or playback or display the output data (e.g., decoder buffer usage, delay, noise, playback quality), current computing environment (e.g., network bandwidth, workload), user instructions, or any other suitable information relevant to rate control.

Still referring to FIG. 1, the packaging module 116 of the transmitter 102 can be configured to package the encoded data from the encoder 114 for transmission to the receiver 104. For example, the packaging module 116 can be configured to package the encoded data into one or more packets. Each packets may comprise at least a portion of the encoded data that is encapsulated by metadata about the encoded data such as a header portion (affixed before the encoded data) or a tail portion (appended to the end of the encoded data). Such metadata may be configured to facilitate data verification, error detection, and/or decoding at the receiver. The packaging module 116 may pass the packets onto a communication module (not shown), which transmits the packets to the receiver 104. Alternatively, the packaging module 116 may be configured to transmit the packets.

In some embodiments, the receiver 104 can be implemented on a remote terminal described herein (e.g., a remote controller, a mobile device) configured to receive the encoded image frames 108 from the transmitter 102. In some embodiments, the receiver 104 can comprise a verification module 128, a feedback generation module 130, a decoder 132, and a receiver context management module 134. Optionally, the receiver 104 may be operably connected to or include a communication unit (not shown) configured to communicate with the transmitter 102. These components can be implemented by one or more processor configured to implement executable instructions stored in non-transitory storage media. The one or more processors can include ARM processors, ASICs, FPGAs, CPUs, GPUs, and the like. In some embodiments, the components of the receiver 104 may be implemented using hardware acceleration techniques.

The verification module 128 can be configured to verify the integrity of the encoded data 108. For example, the verification module 128 may be configured to receive packets containing encoded data 108 from the transmitter 102, extract the information contained in the packets, and verify that no error occurred during transmission. For example, the verification module 128 may be configured to extract metadata (e.g., header and/or tail information) associated with the encoded data from each packet. The metadata may include verification data useful for verifying integrity and/or authenticity of the encoded data. Examples of such verification data can include a error-detection code or error-correction code such as a checksum, a length, digital signature, encryption key information, timestamp, or any other verification data. If encoded data is transmitted in multiple packets, then each of the packet must be received and verified to detect any transmission error. Then the encoded data extracted from each of the packets may be combined in a given order (e.g., as determined by a packet sequence number associated with each packet) before the combined data is decoded by a decoder.

In some embodiments, the encoded data can be checked directly using the verification data. Alternatively or additionally, the encoded data can be transformed and/or decoded (e.g., uncompressed, decrypted) before being checked using the verification data. Such verification may be used to determine whether an error or security breach occurred during data transmission (e.g., data loss or data modification). Alternatively or additionally, such verification may be used to determine whether an error occurred locally at the receiver, e.g., during the decoding process.

Examples of the metadata can include frame identifier, frame type (e.g., I-frame, short-term-P-frame, long-term-P-frame), reference frame offset, timestamp, frame rate, data rate, resolution, and the like. The frame type can correspond to a mode under which the frame is encoded. For example, the frame type can be an I-frame or a P-frame. In another example, the frame type may be an I-frame, a short-term-P-frame interframe encoded using a short-term reference frame, or a long-term-P-frame interframe encoded using a long-term reference frame. In some embodiments, the metadata about the encoded frame can be used to determine whether a given frame can be reconstructed without having to decode the encoded data. For example, the frame identifier and frame type can be verified to ensure that the correct frame is received. The reference frame offset can be used to determine availability of a reference frame useful for decoding the received frame. If such a reference frame is not received and/or decoded correctly, then it can be determined that the received frame cannot be reconstructed successfully without decoding the received frame. In some embodiments, some or all of the metadata may be used to facilitate the decoding of the encoded data. For example, the frame type can be used to determine the corresponding decoding mode and the reference frame index can be used to locate the reference frame used to decode the encoded frame. As another example, the frame rate and the data rate can be used to dictate aspects of the decoding process.

In some embodiments, the verification module 128 can be configured to determine an operational status of one or more software and/or hardware components of the receiver. As discussed above, certain verification data received with the encoded data can be used to verify whether the decoder is working properly. The verification module 128 can be configured to indicate a hardware and/or software failures (e.g., buffer errors, device failure, memory failure, operating system error, application error). The verification module 128 can be configured to determine the status based on information (e.g., error code) provided such components or by polling such components (e.g., on a regular basis and/or under a diagnostic mode).

The result of the verification module 128 can be provided to the feedback generation module 130 and/or the decoder 132. The feedback generation module 130 can be configured to generate feedback information regarding the receiver based on the result of the verification module 128 and/or based on information provided by the decoder 132. For example, the result from the verification module 128 may indicate whether an error has occurred during transmission of a frame (e.g., data loss or data modification). Information provided by the decoder 132 may indicate whether an error has occurred during decoding of a frame. In various embodiments, the feedback generation module 130 may be configured to generate the feedback information based on the result of the verification module 128 alone, information provided by the decoder 132 alone, or both. In some embodiments, the feedback generation module 130 may be configured to generate feedback information based on other information such as a status of a hardware/software component of the receiver, an environment of the receiver (e.g., noise or interference), a physical position/orientation of the receiver, a user input, and the like.

In some embodiments, the feedback information may include information about a status indicator and a frame identifier. The status indicator may indicate whether a certain frame has been received successfully. The status indicator may indicate whether a certain frame has been decoded or reconstructed successfully. As used herein, reconstructing a frame comprises decoding all or portions an encoded frame. Reconstructing a frame may optionally include combining portions of encoded frame before the decoding process, and/or combining decoded portions of the frame after the decoding process. The status indicator may indicate whether a hardware/software component of the receiver is working properly. The frame identifier may indicate a frame for which the status indicator is relevant. For example, if the status indicator indicates an error, the frame identifier may identify the last frame or any previous frame that has been correctly received and/or successfully decoded before the generation of the feedback information.

In some embodiments, the feedback information may include other information about the receiver that may be useful for improving the efficiency and reliability of data transmission. Such information may include, for example, a timestamp associated with the generation and/or transmission of the feedback information, an interval at which feedback information is being sent, synchronization information useful for synchronizing the data transmission between transmitter and the receiver (e.g., working frequency or frequencies, hopset information), and the like.

In some embodiments, the feedback information may be generated at a fixed feedback generation interval or at a variable feedback generation interval. The interval may be previously-agreed on by the transmitter and the receiver. The interval may be dynamically determined based at least in part on channel capacity, the requirement of a transmitter application regarding the promptness of error recovery, bitrate requirement, error rate (e.g., bit error rate or bit error ratio) within a predetermined period of time, statistics regarding previous data transmissions, and the like. Alternatively or additionally, the generation of feedback information may be triggered by certain predefined events such as a change in an environment of the receiver (e.g., a change in signal to noise ratio (SNR), a change in channel capacity or network bandwidth), a change in a hardware or software status or setting, after receiving or decoding of a new frame, and the like.

In some embodiments, the feedback information may be provided to a communication unit (not shown), which may be configured to transmitted to the feedback information to the transmitter in a feedback message at a fixed feedback transmission interval or at a variable feedback transmission interval. The interval may be previously-agreed upon by the transmitter and the receiver. The interval may be dynamically determined based on channel capacity, bitrate requirement, information provided by the transmitter, and the like. For instance, the receiver may be configured to transmit at a first interval. The transmitter may be configured to transmit a second interval to the receiver. The receiver may be configured to transmit at a third interval that is determined based on the first interval and the second interval. For example, the third interval may be a maximum, a minimum, or an average of the first and the second intervals.

Alternatively or additionally, the transmission of feedback information may be triggered by certain predefined events such as the generation of the feedback information, a change in an environment of the receiver (e.g., a change in signal to noise ratio (SNR), a change in channel capacity or network bandwidth), a change in a hardware or software status or setting (e.g., detection of a hardware or software failure or error), after receiving or decoding of a frame, when the transmission error rate has exceeded a predetermined threshold value, and the like. In some examples, the feedback information may be transmitted only after a predetermined threshold amount of time has lapsed since the generation of the feedback information. In some other examples, the feedback information is transmitted within a predetermined threshold amount of time since the occurrence of certain events (e.g., detection of an error). In various embodiments, the intervals and/or thresholds discussed herein (e.g., with respect to feedback generation and/or feedback transmission) may be predefined or dynamically configurable by a user, or an automatic or semi-automatic process. In some examples, the automatic or semi-automatic process may be based on machine-learning techniques.

In some embodiments, the decoder 132 can be configured to decode received data in order to reconstruct a frame. A decoder may be configured to perform decoding steps that are the inverse of the encoding steps of the encoder described herein to generate decoded or reconstructed data. The reconstructed data may then be displayed or played back. For example, to decode intra encoded data (e.g., I frames), the decoding steps include an entropy decoding step (e.g., using variable length decoding), an inverse quantization step, and an inverse transform step (e.g., using Inverse Discrete Cosine Transform (IDCT)) that perform the inverse of the corresponding entropy encoding, quantization, and transform steps of the encoder. To decode inter encoded data (e.g., B frames or P frames), the decoding process can include additional motion compensation support.

As discussed herein, aspects of the decoding process may be controlled by information provided by the verification module. For example, metadata associated with the encoded data may be used to determine a code mode, a reference frame to use, if any, and/or one or more coding parameters for decoding a given frame.

In some embodiments, the receiver context management module 134 can be configured to manage receiver context information. Receiver context information can include information useful for decoding encoded frames received from the transmitter. For example, the context information may include an identifier of the last successfully decoded frame. This information may be useful for generating feedback information. In some embodiments, the receiver context management module 134 can maintain a reference frame list that includes one or more frames that have been successfully received and decoded by the receiver. The reference frame list may be used by the decoder to decode received encoded frames. In some cases, the reference frame list at receiver (also referred to as "receiver reference frame list") may include the same as or a subset of the reference frame list at the transmitter (also referred to as "transmitter reference frame list"). In some other cases, the reference frame list at the receiver may include one or more frames that are not on the reference frame list at the transmitter. In some embodiments, the receiver reference frame list may be managed in a similar manner as the transmitter reference frame list described above. For example, a sliding window mechanism may be used to control a size of the reference frame list. The sliding window may be "advanced" to include a newly decode frame and/or updated to change the order of the reference frames as described herein.

Figure 2:
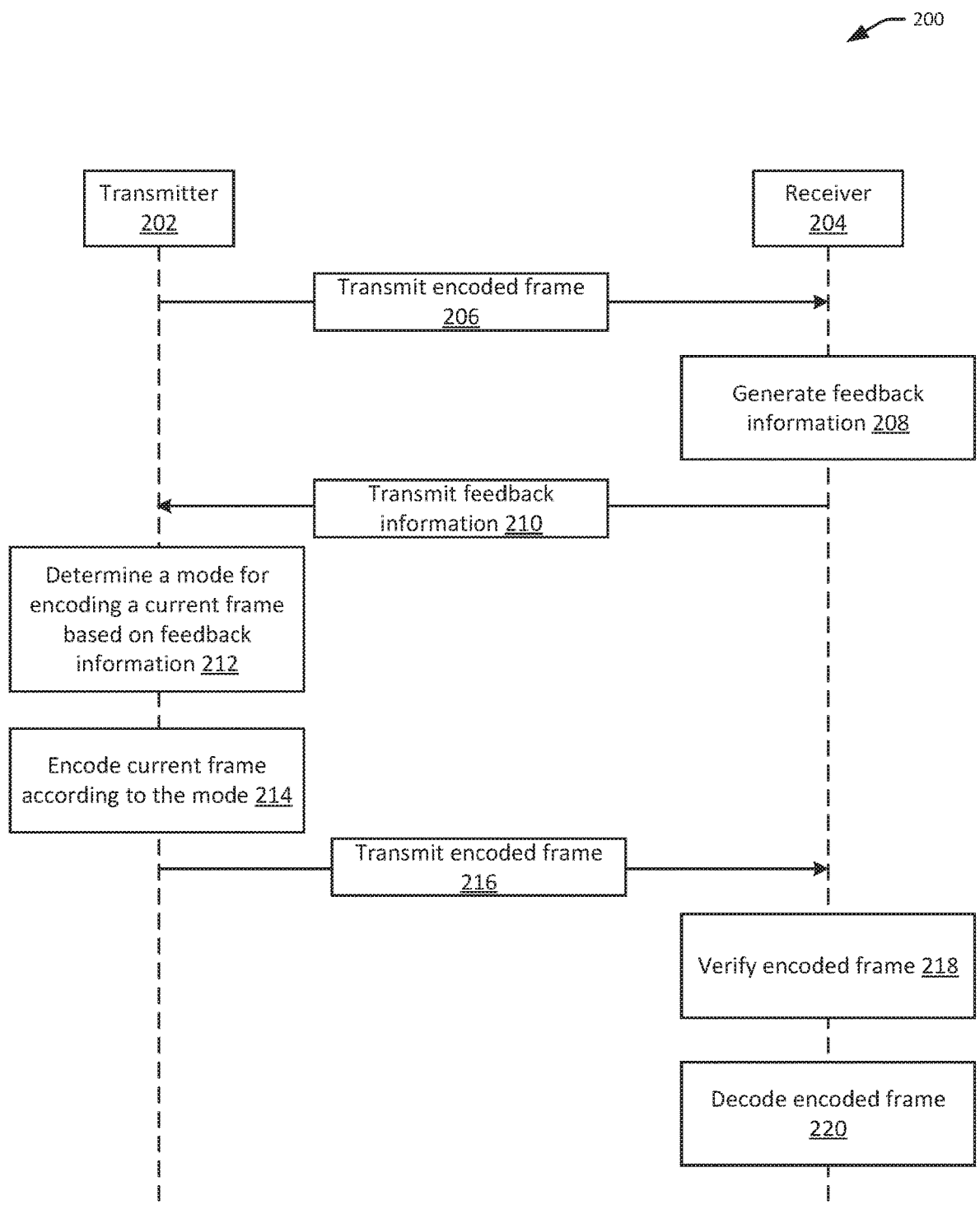
FIG. 2 illustrates an exemplary process for communication between a transmitter and a receiver.

FIG. 2 illustrates an exemplary process 200 for communication between a transmitter 202 and a receiver 204. The transmitter 202 and the receiver 204 may be similar to the transmitter 102 and the receiver 104 of FIG. 1, respectively. Some or all aspects of the process 200 (or any other processes described herein, or variations and/or combinations thereof) may be performed by one or more processors onboard the UAV, a payload of the UAV (e.g., an imaging device), and/or a remote terminal. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

In the illustrated embodiment, the transmitter 202 can be configured to transmit 206 an encoded frame to the receiver 204. The encoded frame may or may not be enclosed in additional header/tail information that is added to facilitate verification and/or decoding of the encoded data. In some embodiments, the encoded frame may be encoded based at least in part on feedback information transmitted by the receiver 204.

Subsequently, the receiver 204 can be configured to generate 208 feedback information. The feedback information may be generated at least partially in response to receiving of the encoded frame. For example, the receiver 204 may have received the encoded data 206, but has detected an error in verification of the received data. In this case, feedback information indicative of the verification error may be generated. In some embodiments, the verification may be based at least in part on header and/or tail information as described herein. As another example, the receiver 204 may have received the encoded data 206 and verified its integrity/authenticity, but has failed to decode the data properly due to a decoder error. In this case, feedback information indicative of the decoding error may be generated. In yet another example, the generation of the feedback information may not be responsive to the receiving of the encoded data, but may be based on the lack of received data. For example, it may be determined that a packet representing at least a portion of a frame is missing based on the sequence numbers of the packets already received. In some embodiments, the generation of the feedback information may be triggered by other events such as a hardware/software failure, a lapse of a timer (e.g., a predetermined amount of time has lapsed since the last time feedback information is generated), a change in receiver environment, a user input, and the like.

In some embodiments, the feedback information can indicate whether an error has occurred at the receiver and optionally a type of the error. Additionally, the feedback information may include context information at the receiver, such as an identifier of the last frame or any frame before the last frame that was successfully decoded at the receiver. Such context information, combined with the status indicator, can be used by the transmitter to customize the encoding of the next frame to improve the reliability and efficiency of data transmission. For example, when there is an error at the receiver, context information can be useful for determining a suitable error recovery mechanism at the transmitter, so as to minimize bandwidth and/or changes in bitrate while substantially maintaining the quality of the transmitted bitstream.

The feedback information can be transmitted 210 to the transmitter. The feedback information can be transmitted at fixed or varied time intervals. The intervals may be mutually agreed upon by the transmitter and the receiver. The intervals may be dynamically determined based on various factors such as channel capacity, the requirement of a transmitter application regarding the promptness of error recovery, error rate (e.g., bit error rate or bit error ratio) within a predetermined period of time, data regarding previous data transmissions, and the like.

The transmitter can be configured to determine 212 a mode for encoding a current frame based at least in part on the feedback information from the receiver. If multiple feedback messages have been received from the receiver since the last frame encoding, then the latest feedback message may be used to determine the coding mode. Determining the coding mode may include selecting a coding mode from a plurality of coding modes comprising an intraframe mode, a short-term interframe mode, and a long-term interframe mode. In some examples, determining the coding mode may include selecting a reference frame to be used for interframe encoding.

In some examples, the coding mode may be determined based on a status indicator included in the feedback information. For example, if an error has occurred, then an coding mode associated with a predetermined error recovery mechanism may be used. In some cases, additional information such as the type of the error and other information may also be used to determine the coding mode. If no error has occurred, then a default coding mode (e.g., short-term interframe mode) may be used. Additionally or alternatively, the mode may be determined based on a difference between a frame identifier included in the feedback information and the frame identifier of the current frame. The difference may be compared with a predetermined threshold and the comparison result may be used to determine the coding mode.

In some embodiments, other factors can also be used to determine the coding mode, such as characteristics of the communication channel between the transmitter and the receiver (e.g., capacity, noise, error rate), use case or application-specific requirement at the transmitter and/or receiver, a state at the receiver, a state at the transmitter, and the like.

Once the coding mode is determined, the current frame can be encoded 214 according to the coding mode. The encoded frame data can be transmitted 216 to the receiver 204 in one or more packets. Optionally, in some embodiments, the encoded data may be packaged with additional metadata information (e.g., header and/or tail information) prior to being transmitted to the receiver 204. Such metadata information may facilitate efficient verification and/or decoding at the receiver 204. In some other embodiments, the encoded data may not be associated with additional metadata information.

The receiver 204 can be configured to verify 218 the received encoded data. The verification may be performed based on the metadata information associated with the encoded data and/or the encoded data itself. The verification can include checking the integrity and/or authenticity of the encoded data. In various embodiments, the verification can occur at any suitable point in time and the verification can be performed for at least a portion of the encoded data. For example, the verification can occur with respect to at least a portion of the encoded data before the encoded data is decoded by a decoder at the receiver. Alternatively or additionally, the verification can occur with respect to at least a portion of the decoded data after the decoding.

The receiver 204 can be configured to decode 220 the encoded frame. The decoding can occur according to a decoding mode that correspond to the coding mode that is determined at step 212. For instance, if the frame is encoded under an intraframe mode, then the frame is decoded using only information contained within the frame. If the frame is encoded under a short-term interframe mode, then the short-term frame is used for decoding the frame. If the frame is encoded under a long-term interframe mode, then the long-term frame is used for decoding the frame. In some embodiments, header/tail information associated with the encoded data can be useful for decoding the frame. For instance, the header/tail information may indicate a type of the encoded frame (e.g., I-frame or P-frame). The header/tail information may also indicate an index of a reference frame relative to the encoded frame, so that a decoder can look up the reference frame to decode the interframe encoded frame.

In some embodiments, the decoded frame may be displayed or played back on the same or a different terminal as the receiver 204.

In various embodiments, frames encoded based on the feedback information can promote efficient, effective, and reliable error recovery at the receiver (e.g., from data loss or decoding error) while minimizing the performance impact of such error recovery, e.g., on the latency and/or quality of video transmission. The extra context information provided by the header/tail associated with the encoded data can further improve the overall efficiency of the system.

Figure 3:
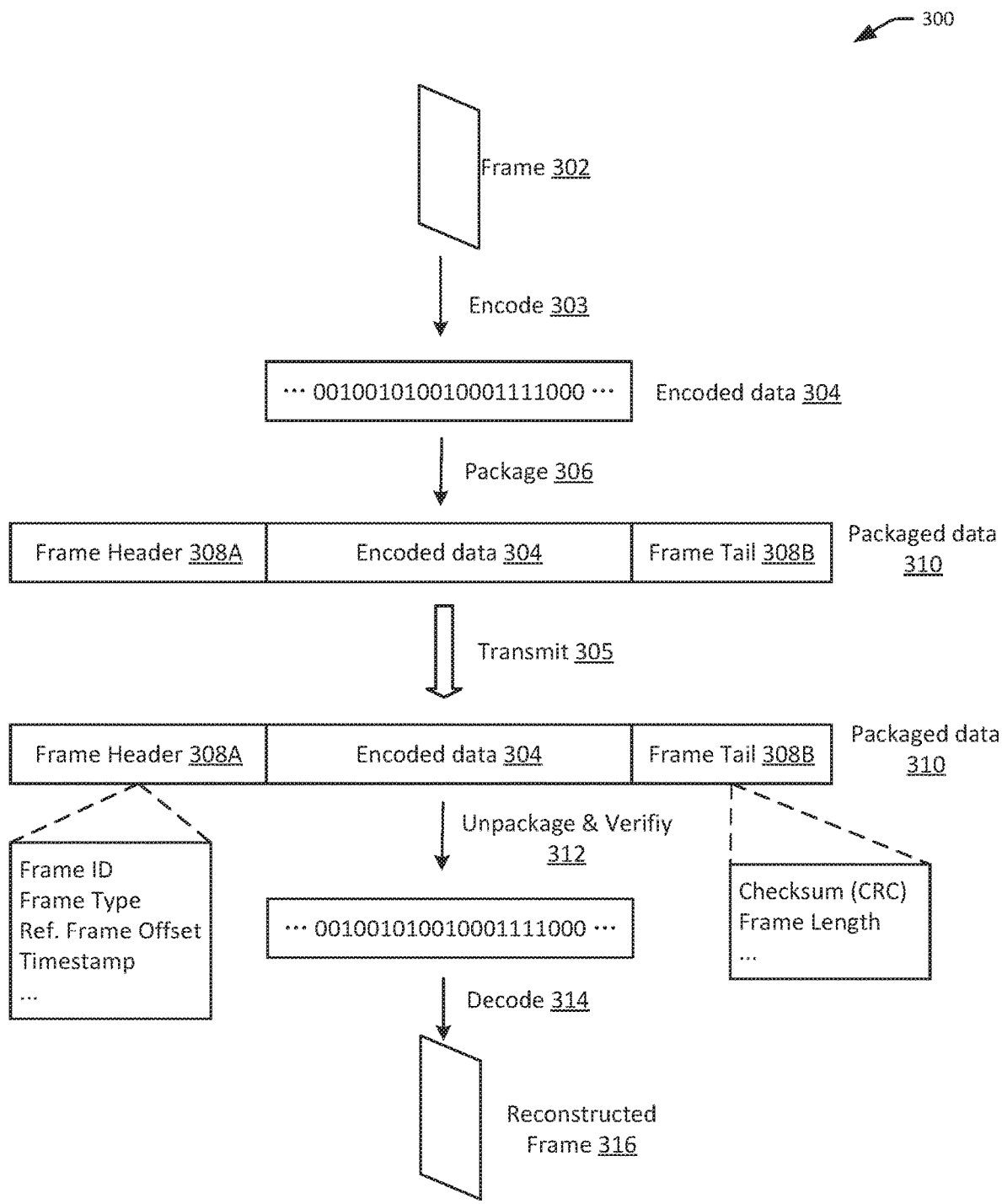
FIG. 3 illustrates an exemplary process for data transmission, in accordance with embodiments.

FIG. 3 illustrates an exemplary process 300 for data transmission, in accordance with embodiments. A frame 302 can be encoded 303, by an encoder, to derive encoded data 304, which may comprise a series of bits. In some embodiments, encoding the frame can include compressing, encryption, or otherwise transforming the frame data. The encoded data 304 may be packaged 306 in one or more packets. Each packet 310 may comprise at least a portion of the encoded data 304 and optionally, metadata 308 about the encoded data. In some embodiments, the metadata 308 also includes an identifier or sequence number for the packet. The packet identifier can be used by the receiver to detect missing or out of order packets. The packaged data packet(s) 310 can be transmitted 305 over a data communication channel (which may be the same or different from the feedback communication channel) to a receiver.

The receiver may be configured to unpack and verify 312 the received data packets 310. In particular, for each packet 310, the metadata 308A and 308B can be extracted and used for verifying the integrity of the encoded data 304, detecting any error that may have occurred during transmission, and checking reconstructability of the encoded frame. For instance, if one of a plurality of packets for the encoded frame is missing, then the frame cannot be constructed. As another example, errors can be detected by checking an error detection code associated with the encoded data. In some embodiments, the verification can occur prior to actually decoding the encoded data. Alternatively or additionally, the metadata may be useful for verifying validity of the decoded data after the decoding process.

In some embodiments, the metadata can include header data 308A prefixed before the encoded data 304 and/or tail data 308B appended after the encoded data 304. For example, the header 308A can include fields such as a frame identifier of the encoded frame, a type of the encoded frame (e.g., I-frame, P-frame, B-frame), a reference frame offset (e.g., from the current frame identifier), a timestamp (e.g., for when the encoding is done), a frame rate (e.g., frames per second), a data rate or bitrate (e.g., megabits per second), a resolution, and the like. The tail 308B can include fields such as an error detection code or an error correction code of the encoded frame, a length of the frame, a tail identifier, and the like. Examples of error detection or correction codes can include repetition codes, parity bits, checksums, cyclic redundancy checks (CRCs), cryptographic functions, and the like.

In some embodiments, only the header 308A or the tail 308B may be available. In some embodiments, the header 308A and the tail 308B may include more or less information than described above. For example, the header and/or tail may include a digital signature from a sender of the encoded data and/or a desired feedback transmission interval.

In some embodiments, the error-detection code and frame length included in the metadata can be used to check the data integrity of the encoded data (e.g., no data corruption or data loss). The frame identifier included in the metadata can be used to ensure it is a new frame that has not been previously received by the receiver, to detect out-of-order frames, and/or to detect "skipped" frames. The frame type can be used to determine whether additional data is required for the reconstruction of the frame. For example, an I-frame does not require any additional data to decode the frame, whereas a P-frame requires one or more reference frames. The reference frame offset can be used to identify the reference frame required to decode a P-frame. During a check for reconstructability of the encoded frame, the reference frame offset can be used to determine whether the reference frame is available at the receiver and whether itself has been reconstructed properly. The received frame can only be reconstructed if both of the above conditions are satisfied.

In some embodiments, the timestamp can be used by the receiver to calculate the time interval between the encoding of the frame at the transmitter and the receipt of the frame at the receiver. The time interval may be useful for determining a condition of the communication channel, a validity of the received data, a feedback transmission interval, and the like. The determination may be based on a comparison between the time interval and one or more predetermined thresholds. The frame rate and the data rate may be used to determine a suitable decoding and/or playback strategy. In some embodiments, a digital signature included in the metadata can be used to authenticate that the encoded data comes from a trustworthy source. In some embodiments, a desired feedback transmission interval included in the metadata can be used by the receiver to determine a suitable feedback transmission interval.

After verification, the encoded data 304 can be decoded 314 by a decoder that corresponds to the encoder used to generate the encoded data 304, and the decoded data can be used to reconstruct the frame 316. In some embodiments, decoding can include decompressing, decryption, or otherwise reconstructing the frame data. Reconstruction can comprise combining decoded data in a predetermined manner.

In an embodiment, the metadata described herein can be provided outside of (e.g., in a separate data structure from) the bitstream generated by an encoder. In an alternative embodiment, the metadata may be provided as part of the bitstream generated by the encoder. For example, some coding formats according to certain coding standards include a portion for storing such user-defined metadata, in addition to a portion for storing the encoded data. The metadata described herein may be stored as part of such user-defined metadata of the bitstream. The metadata can be extracted by the receiver before decoding of the encoded data, as described elsewhere. Advantageously, in latter embodiment, data transmitted by can be handled by a standard-compliant decoder (which supports a coding format with such a user-defined metadata portion), without requiring non-standard handling of metadata outside the bitstream. In yet some other embodiments, the some portion of the metadata may be placed outside the bitstream while some other portion of the metadata may be placed within the bitstream.

In some embodiments, the placement of the metadata (within the bitstream or outside the bitstream) may be configurable by a user or a system administrator. In some example, the placement of the metadata may be automatically determined based on a type of the codec used to encode/decode the frames. If the codec supports user-defined metadata, then the metadata is transmitted as part of the bitstream. Otherwise, the metadata data is transmitted outside the bitstream.

Certain coding (e.g., compression/decompression) standards limit the types of reference frames that may be used for encoding/decoding. For example, a certain coding standard may require that a P-frame can only be encoded using a short-term reference frame, and does not allow the use of a long-term reference frame. The techniques described herein allows encoding and decoding using an arbitrary reference frame, thereby obviating the need for support by the coding standards. To this end, the feedback information from a receiver can specify a desirable reference frame to use for encoding a frame. And the metadata from the transmitter can describe the reference frame to use for decoding the frame.

Figure 4:
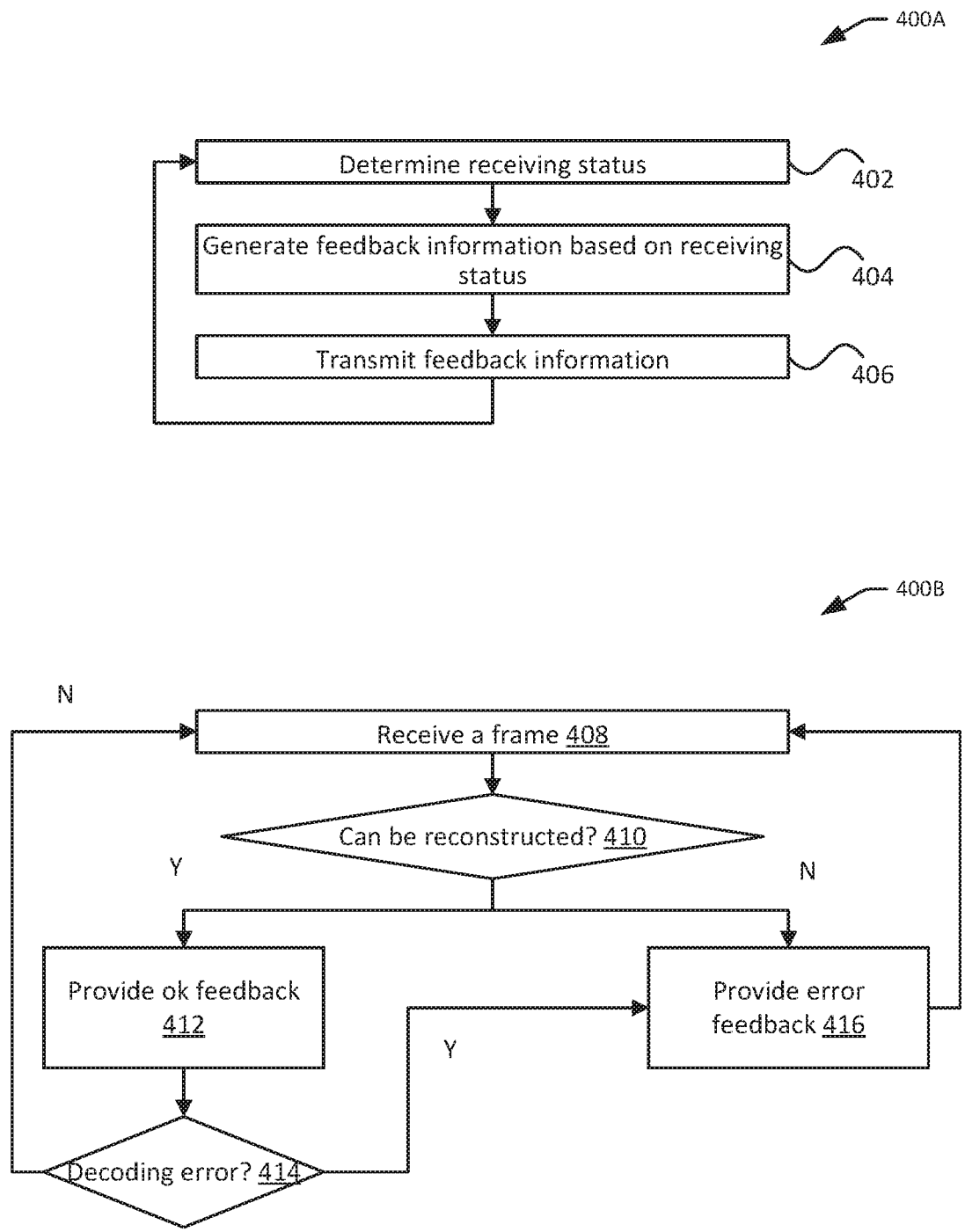
FIG. 4 illustrates exemplary processes for receiving data, in accordance with embodiments.

FIG. 4 illustrates exemplary processes 400A and 400B for receiving data, in accordance with embodiments. In some embodiments, the processes may be implemented by a receiver such as receiver 104 or 204 described in FIG. 1 or FIG. 2, respectively.

Turning first to process 400A. At block 402, a receiving status is determined. A receiving status can indicate a status with respect to the receipt of one or more frames from the transmitter. The receiving status can indicate whether encoded data representing an encoded frame has been received successfully (e.g., without loss or corruption of data) and/or whether the encoded data has been decoded successfully. The determination of the receiving status can be obtained by verification of the received data and/or the decoding result. For example, data loss may be detected when a certain frame is "skipped" and not received (e.g., frames 1, 2 and 4 are received, but frame 3 is not). As another example, data loss can occur when a packet encapsulating a portion of the encoded frame is not received. As another example, data corruption may be detected by validating a checksum or CRC of the received data. In some embodiments, the receiving status may indicate a status of a hardware/software component of the receiver, a change in an environment of the receiver (e.g., increased noise level or interference), a change in physical position/orientation of the receiver, a user input, and the like. For example, it may be determined whether a hardware device or software application for receiving, decoding, displaying, or playing back of the decoded frame is functioning properly. In various embodiments, the receiving status may be determined by tracking received data and/or analyzing output or status code from various software and/or hardware components.

At block 404, feedback information is generated based on the receiving status. Some or all of the information included in the feedback information can be used by the transmitter to determine how to encode one or more frames, as described elsewhere herein. In some embodiments, the feedback information can be generated by including a status indicator and an identifier of a previously-received frame. The status indicator can indicate the receiving status determined at block 402. The status indicator may indicate a transmission status (e.g., whether there is data loss or data modification during transmission of a frame) and/or a decoding status (e.g., whether there is an error or failure during the decoding of a frame). For example, the status indicator can be selected from a plurality of predefined values, each representing a unique receiving status. In an example, the status indicator may be set to "0" to indicate that an error occurred and "1" to indicate that no error occurred; or vice versa. In another example, the value of the status indicator may indicate more detailed information about a type of error. For example, the status indicator may be set to "2" to indicate a decoder error and "3" to indicate data corruption or data loss.

The feedback information can also include an identifier of a previously-received frame. The previously-received frame may be the last frame or any frame before the last frame that was received and/or reconstructed successfully by the receiver before generation of the feedback information. In some embodiments, the reference frame identifier in the feedback information can be set to a predetermined value (e.g., null) to indicate that the receiver does not have a reliably reconstructed reference frame and that an intraframe encoded frame (I-frame) is requested. In some embodiments, the status indicator and the frame identifier are both set in the feedback information regardless of the status indicator. In some other embodiments, the frame identifier is only set when the status indicator indicates error.

In some embodiments, the feedback information may include more than a status indicator and a frame identifier. For example, the feedback information can include more than one frame identifier, such as an identifier of a successfully reconstructed frame, as well as the identifier(s) of reference frame(s) used to decode the frame. In some cases, the feedback information can include an indication of whether some or all of the identified reference frame(s) are still available at the receiver. As another example, the feedback information can include a timestamp that indicates certain event that occurred at the receiver. For example, the timestamp can indicate a time when a previous frame was received, decoded, or reconstructed at the receiver. As another example, the feedback information may include a feedback interval that indicates the current frequency at which feedback information is transmitted.

As an example, assume frames 1 and 2 have been received in sequence and reconstructed properly, but frame 3 is not received after a predetermined period of time has expired since the receipt of the last frame ("1", "2" and "3" are frame identifiers for the respective frames). Then the feedback information, generated after the expiration of the predetermined period of time, may include a status indicator indicating that an error (or more specifically, a transmission error) and the frame identifier "2", which indicates the last frame that has been received and reconstructed properly. Alternatively, the frame identifier can be any frame that has been successfully received and reconstructed, such as "1". Similar feedback information may be generated when frame 3 is "skipped" at the receiver. For example, when frames 1, 2, and 4 are received by the receiver but not frame 3 is not received before frame 4 or not received within a predetermined period of time from the receiving of frame 2. In cases where an encoded frame is transmitted in more than one packets, each containing a portion of the encoded data, receiving the frame means receiving one or more such packets. Correctly or successfully receiving a frame means that all packets containing the encoded data for the frame are received correctly.

Without the frame identifier in the feedback information, the transmitter would need to intraframe encode a subsequent frame as an error recovery mechanism, to ensure that the receiver can decode the frame without relying on any reference frames. Based on the frame identifier in the feedback information, the transmitter can instead interframe encode a subsequent frame using a reference frame identified in the feedback information (e.g., frame 1 or frame 2) and the receiver would be able to reliably decode the encoded P-frame. Since interframe encoding is typically more efficient than intraframe, the overall efficiency of the system is improved.

At block 406, the feedback information is transmitted to the transmitter at certain intervals. Typically, the shorter the feedback transmission interval, the more likely that a certain reference frame (e.g., a long-term reference frames or a short-term reference frame) exists in a reference frame list at the transmitter, and the more likely an error recovery mechanism using a long-term or short-term P-frame will succeed. Also, the shorter the feedback transmission interval is, the closer the reference frame is to the current frame temporally, the more efficient the encoding will be, and the speedier the recovery. However, more frequent feedback messages may take up more channel bandwidth, decreasing the efficiency of channel usage.

Conversely, the longer the feedback transmission interval, the more likely that a certain reference frame (especially a long-term reference frame) no longer exists in a reference frame list at the transmitter, and the more likely an error recovery mechanism using an I-frame will succeed. Also, the longer the feedback transmission interval is, the farther the reference frame is to the current frame temporally, the less efficient the encoding will be, and the longer it takes to recover from the error. However, less frequent feedback messages may take up less channel bandwidth, increasing the efficiency of channel usage.

In some embodiments, the feedback information is transmitted at fixed intervals. The fixed intervals may be preset by the system or configured by a user. In some other embodiments, the feedback information is transmitted at variable intervals. The intervals may be determined (or adjusted) dynamically or in real-time while the transmitter and the receiver are communicating with each other. In some cases, the interval may be determined by the receiver. In some other cases, the interval may be determined by the transmitter and communicated to the receiver. In some cases, the interval may be determined by the receiver based on information provided by the transmitter. In some embodiments, the fixed or variable intervals may be determined based on a channel capacity, a requirement of a transmitter or receiver application regarding the promptness of error recovery, a bitrate or an error rate, statistics regarding previous data transmissions, a state of the transmitter or the receiver (e.g., attitude, velocity, altitude, position), and the like.

In some embodiments, the feedback transmission intervals may be determined or adjusted based on a current condition of the communication channel used for transmitting the feedback information (feedback channel), such as its capacity and/or quality. For example, when the channel capacity is greater than or equal to a predetermined threshold, the interval may be lengthened. When the channel capacity is less than or equal to the predetermined threshold, the interval may be shortened. As another example, when the channel quality is good (e.g., less noise or interference, strong signal strength), then the interval can be lengthened to reduce the burden on the channel. When the channel quality is poor, the interval can be shortened to ensure more reliable data transmission.

In some embodiments, the feedback transmission intervals may be determined or adjusted based on specific requirements of a use case or application scenario regarding timeliness of error recovery. In some examples, the feedback transmission intervals may be determined or adjusted automatically based on the statistics regarding previous data transmission including success rate or ratio, error rate (e.g., BER or PER), and the like. For example, the current use case (e.g., based on a network environment or hardware configuration of a device used to playback the reconstructed frames) may require a certain minimum success rate of transmission. For example, it may be required that at least 3 frames out of every 5 frames are transmitted correctly. Thus, the predetermined success rate is 3/5. Then, during the actual transmission of frames, if the average rate of successfully transmitted frames is equal to or greater than 3/5, then the interval may be lengthened. On the other hand, if the average rate of successfully transmitted frames is less than 3/5, then the interval may be lengthened. Similarly, the feedback interval may be determined or adjusted based at least in part on an error rate requirement such as bit error rate or ratio (BER) or packet error rate or ratio (PER) within a given unit of time. Specifically, the interval may be shortened when the error rate is equal to or exceeds a predetermined threshold value that is required by a specific use scenario, and lengthened when the error rate is less than the predetermined threshold value.

In some embodiments, the feedback transmission intervals may be determined or adjusted based on statistics related to previously-transmitted feedback messages. For example, if the number or ratio of consecutive feedback messages that indicate error (also referred to as "error messages") within a predefined period of time is less than a predetermined threshold number or ratio, and/or if the total number or ratio of error messages within a predefined period of time is less than a predetermined threshold number, then the feedback interval may be lengthened. On the other hand, if the number or ratio of consecutive error messages within a predefined period of time is equal to or greater than a predetermined threshold number or ratio, and/or if the total number or ratio of error messages within a predefined period of time is equal to or greater than a predetermined threshold number, then the feedback interval may be shortened.

In some embodiments, a state of the transmitter, the receiver, or another device may be used to determine the feedback transmission interval. Such state information can include one, two, or three-dimensional information related to position, angle, velocity, linear acceleration, angular acceleration, and the like associated with the transmitter (e.g., UAV, camera) or the receiver (e.g., remote terminal). For instance, the feedback transmission interval can be adjusted by comparing the state information with one or more predetermined threshold values. As an example, when a velocity (angular or linear) associated with a camera or a UAV reaches or exceeds a predetermined threshold, then the difference (e.g., motion) between consecutive images may be large, and the feedback interval may be shortened. When the velocity (angular or linear) associated with a camera or a UAV is less than a predetermined threshold, then the difference between consecutive images may be small, and the feedback interval may be lengthened.

In some embodiments, the state information may be determined based on one or more sensors associated. The sensors can include, for example, gyroscopes, magnetometers, inertial measurement unit (IMU), vision sensors, GPS sensors, altimeters, and the like.

In some embodiments, the feedback transmission interval can be mutually agreed upon by the transmitter and the receiver. For instance, the receiver can be configured to determine a first interval. The first interval may be determined based on any of the factors discussed herein (e.g., channel condition, use case requirement, receiver state). The receiver can be configured to receive a second interval from the transmitter. The second interval may be determined based on any of the factors discussed herein (e.g., channel condition, use case requirement, transmitter state). Based on the first interval and the second interval, the receiver may be configured to determine the third interval at which to transmit feedback information. For example, the third interval may be the greater, the lesser, or the average of the first interval and the second interval.

In some examples, the transmission interval may be set to cover the estimated time for a feedback message to reach the transmitter from the receiver, plus the estimated time for the transmitter to encode the next frame based on the feedback message, and plus the estimated time for the next encoded frame to reach the receiver from the transmitter.

In some embodiments, the receiver context information may be optionally updated. For example, the context information may include information related to the feedback information such as feedback transmission interval, current feedback information, previously-transmitted feedback information, and the like. The receiver context information may also include information useful for decoding frames such as one or more reference frames that have been decoded successfully. Managing the context information may include managing a reference frame list. A sliding window mechanism may be used to control a size of the list. For instance, when a new frame is decoded, the reference frame list may be updated to include newly decoded frame. When the size exceeds a predetermined maximum list size, older frames may be removed from the list. In some embodiments, a long-term reference frame may be kept within the list (e.g., at the head of the list) as long as the error is not recovered, so that the long-term reference frame can be used to decode an error recovery frame sent by the transmitter. In various embodiments, the receiver context information may be updated before, during, or after the generation or transmission of the feedback information.

In some embodiments, the receiver may be configured to repeat the process 400. For example, after a feedback interval has lapsed since the transmission of the last feedback message, or if a triggering event has occurred, a receiving status may be determined 402 again. Depending on the new receiving status, a new feedback message may be generated. For example, if the first feedback message indicates an error, and during the interval between the feedback messages, one or more frames have been received and decoded properly at the receiver, then the second feedback message may be generated to indicate a normal status. Otherwise, if the first feedback message indicates an error, and during the interval between the feedback messages, no frames have been received or decoded properly at the receiver, then the second feedback message may be the same as the first feedback message. In particular, the frame identifier in the second feedback message may remain the same as the frame identifier in the first feedback message. In some cases, status indicator in the first message and the second message may be different to indicate different types of errors. If the first feedback message indicates a normal status, and during the interval between the feedback messages, an error is detected (e.g., a frame is not received or skipped, or a decoder error is detected), then the second feedback message may be set to include an error indicator and a frame identifier of a previously received frame. If the first feedback message indicates a normal status, and during the interval between the feedback messages, one or more frames have been received and/or constructed successfully, then the second feedback message may include the same success indicator as the first feedback message, but the frame identifier may be updated to identify the latest successfully received/reconstructed frame.

Turning next to process 400B. At block 408, a frame is received by a receiver. At block 410, it is determined whether the received frame can be successfully reconstructed. The determination can include estimating the likelihood of a successful reconstruction, assuming no decoder error. The determination may be made prior to actual decoding of the frame and may be based on metadata associated with the received frame, such as the header/tail information described herein. The determination can be made by verifying that a predetermined set of rules are satisfied. The rules may require that there must be no data loss or data corruption. Data loss may be detected by checking whether all packets for a given encoded frame have been received (e.g., by checking the packet identifiers and/or frame identifiers of the packets in the metadata). Data corruption may be detected by checking one or more error detection code or error correction code contained in the metadata. Additionally, different rules may apply depending on the type of the received frame (which may be indicated by the metadata). If the received frame is an I-frame, then no further check may be necessary, and it is deemed likely that the I-frame can be reconstructed successfully. If the received frame is a P-frame, then a reference frame used to encode the P-frame (which may be indicated by the metadata) may need to be checked to ensure that (1) the reference frame is available (e.g., in a reference frame list maintained by the receiver); and (2) the reference frame has been successfully received, decoded, and/or reconstructed. If both conditions are satisfied, then the P-frame is deemed that it is deemed likely that the P-frame can be reconstructed successfully.

In general, the check of reconstructability based on metadata of the received data can be performed much quicker and simpler than the actual decoding of the received data, which can be time consuming and computationally complex. Thus, checking for reconstructability of the received frame prior to the actual decoding can improve efficiency of the system and allow earlier detection of errors and speedier error recovery.

If it is determined at block 410 that the received frame can be reconstructed successfully, then a feedback message indicating an OK status (also referred to as an "ok feedback message") can be generated and transmitted to the receiver. The ok feedback message can include a status indicator indicating a successful or normal condition. The ok feedback message may or may not include a frame identifier that identifies a previously-decoded frame, such as the last successfully decoded frame or any frame before the last frame.

If it is determined at block 410 that the received frame cannot be reconstructed, then a feedback message indicating an error (also referred to as an "error feedback message") can be generated and transmitted to the receiver. The error feedback message can include a status indicator indicating an error. The status indicator may contain the same error code regardless of the type of error. Alternatively, the status indicator can contain different error codes for different types of errors. For instance, a first error code may be used to indicate an error detected by the reconstructability check and a second different error code can be used to indicate an error detected during the decoding process (e.g., a decoder error). Furthermore, the error feedback message may or may not include a frame identifier that identifies a previously-decoded frame, such as the last successfully decoded frame or any frame before the last frame.

At block 414, a received frame is decoded. If there is error during decoding, then an error feedback information is provided at block 416. Otherwise, if the received frame is successfully decoded, then the process 400B loops back to block 408 to receive the next frame. In some embodiments, decoding includes combining decoded portions of the frame. In such embodiments, decoding and reconstruction can be used interchangeably and decoding errors includes an error that occurs during the combination of the decoded data. In other embodiments, decoding does not include combining decode portions. In such embodiments, reconstruction can include decoding and additional steps for combining the decoded data. Feedback messages may or may not be generated in response to errors detected during the combination of the decoded data.

Figure 5:
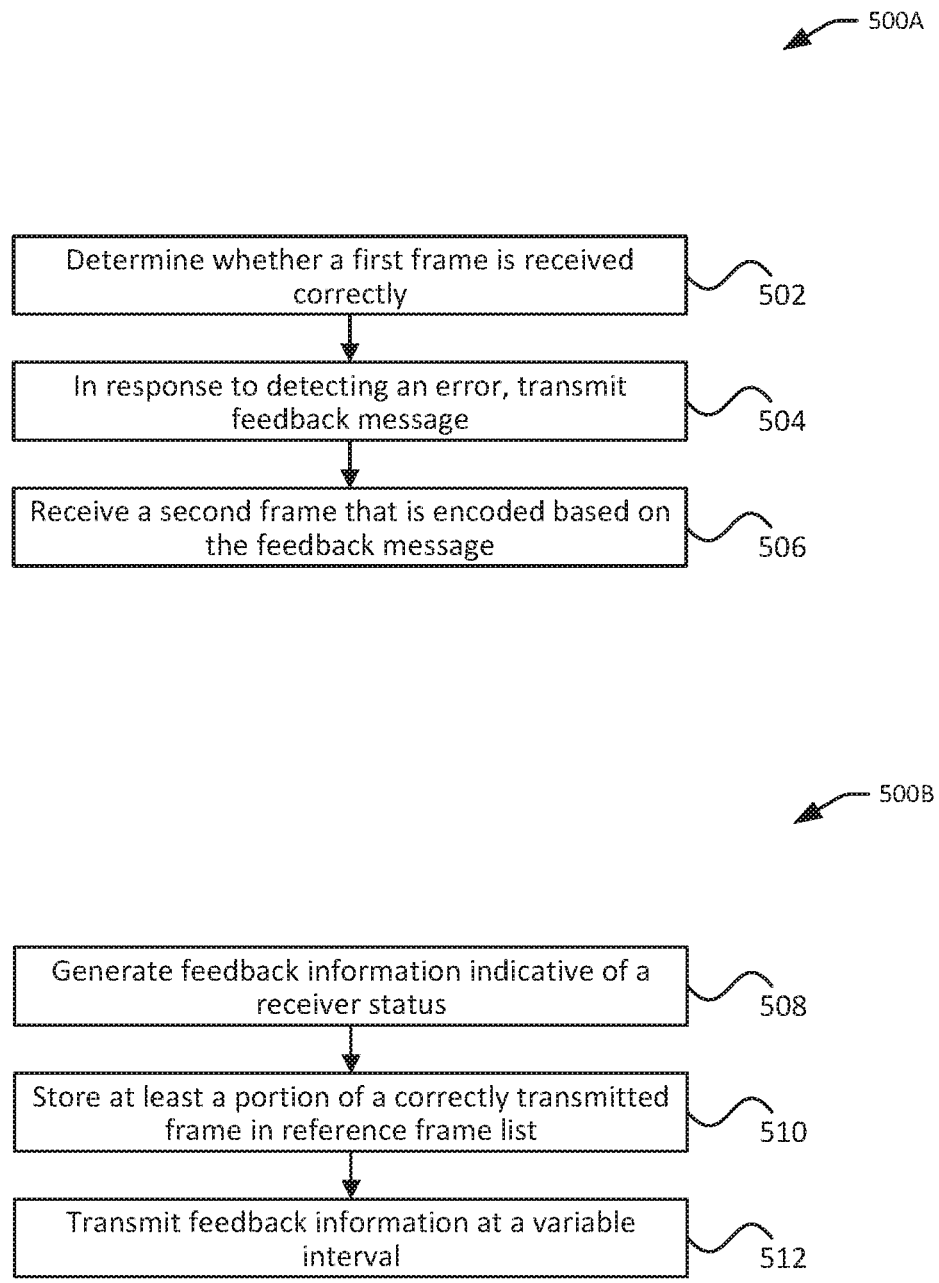
FIG. 5 illustrates exemplary processes for receiving data, in accordance with embodiments.

FIG. 5 illustrates exemplary processes 500A and 500B for receiving data, in accordance with embodiments. In some embodiments, the processes may be implemented by a receiver such as receiver 104 or 204 described in FIG. 1 or FIG. 2, respectively. In some embodiments, the steps of the processes can be repeated by the receiver.

Turning first to process 500A. At block 502, it is determined whether a first frame is received correctly. The first frame may be encoded and transmitted by a transmitter such as transmitter 102 or 202 described in FIGS. 1 and 2, respectively. Determining whether the first frame is received correctly includes determining whether there is any transmission error and/or whether is a decoding error. Transmission error can include data loss or data corruption. Data loss may be determined by checking whether all packets containing the encode data of the frame have been received. Data corruption may be determined by checking an error detection code and/or an error correction code associated with received data. In some examples, a decoder error may be raised by the decoder during decoding of at least a portion of the encoded frame.

At block 504, in response to detecting an error (e.g., transmission error or decoding error), a feedback message is transmitted. The feedback message can include feedback information indicative of the error. For example, feedback message can include a status indicator that indicates the error. Additionally, the feedback message can include a frame identifier that identifies a frame that has been previously received and decoded properly. For example, the frame identifier can identify the last frame that was received and decoded properly before the transmission of the feedback message. Alternatively, the frame identifier can identify any other previously decoded frame before the last frame.

At block 506, a second frame is received after the transmission of the feedback message. The second frame can be encoded and transmitted by the transmitter. The second frame may be encoded by the transmitter based on the feedback information included in the feedback message. For instance, the status indicator and/or the frame identifier in the feedback information may be used to determine whether to intraframe encode or interframe encode the second frame. The status indicator and/or the frame identifier in the feedback information may be used to determine the reference frame used to interframe encode the second frame. In some embodiments, the encoding decision may be additionally based on other factors such application requirements (e.g., bitrate, frame rate, error rate), channel capacity, transmitter/receiver state, and the like.

Turning next to process 500B. At block 508, feedback information is generated that is indicative of a status at the receiver. The feedback information can indicate generally whether any error has been detected at the receiver. For example, the feedback information can include a status indicator with a value of "0" to indicate a normal status and a value "1" to indicate that an error has occurred. Alternatively or additionally, the feedback information can indicate whether a specific type of error has been detected at the receiver. For example, the status indicator can be "1" to indicate a transmission error, "2" to indicate a decoding error, and "3" to indicate an error associated with a software/hardware component. As discussed herein, the feedback information can also include a frame identifier that indicates a previously and successfully received, decoded and/or reconstructed frame.

At block 510, at least a portion of a correctly transmitted frame is stored in a reference frame list at the receiver. As discussed above, the receiver can be configured to maintain a reference frame list that is a subset of the reference frame list at the transmitter. The reference frames in the reference frame list of the receiver can be used to decode received frames. The reference frame list can be updated to include at least a portion of a correctly transmitted and/or decoded frame and to remove older frames in the list, for example, using a sliding window mechanism discussed herein.

At block 512, the feedback information is transmitted to the transmitter at a variable interval. As discussed herein, the interval for transmitting feedback interval can be dynamically adjusted according to a variety of factors such as conditions of the communication channel (e.g., noise or interference), requirements of specific use cases (e.g., error rate, bitrate, resolution, frame rate, latency, bandwidth), statistics of previously transmitted feedback messages, state of transmitter and/or receiver, and the like. In some embodiments, the order of blocks 510 and 512 can be reversed.

Figure 6:
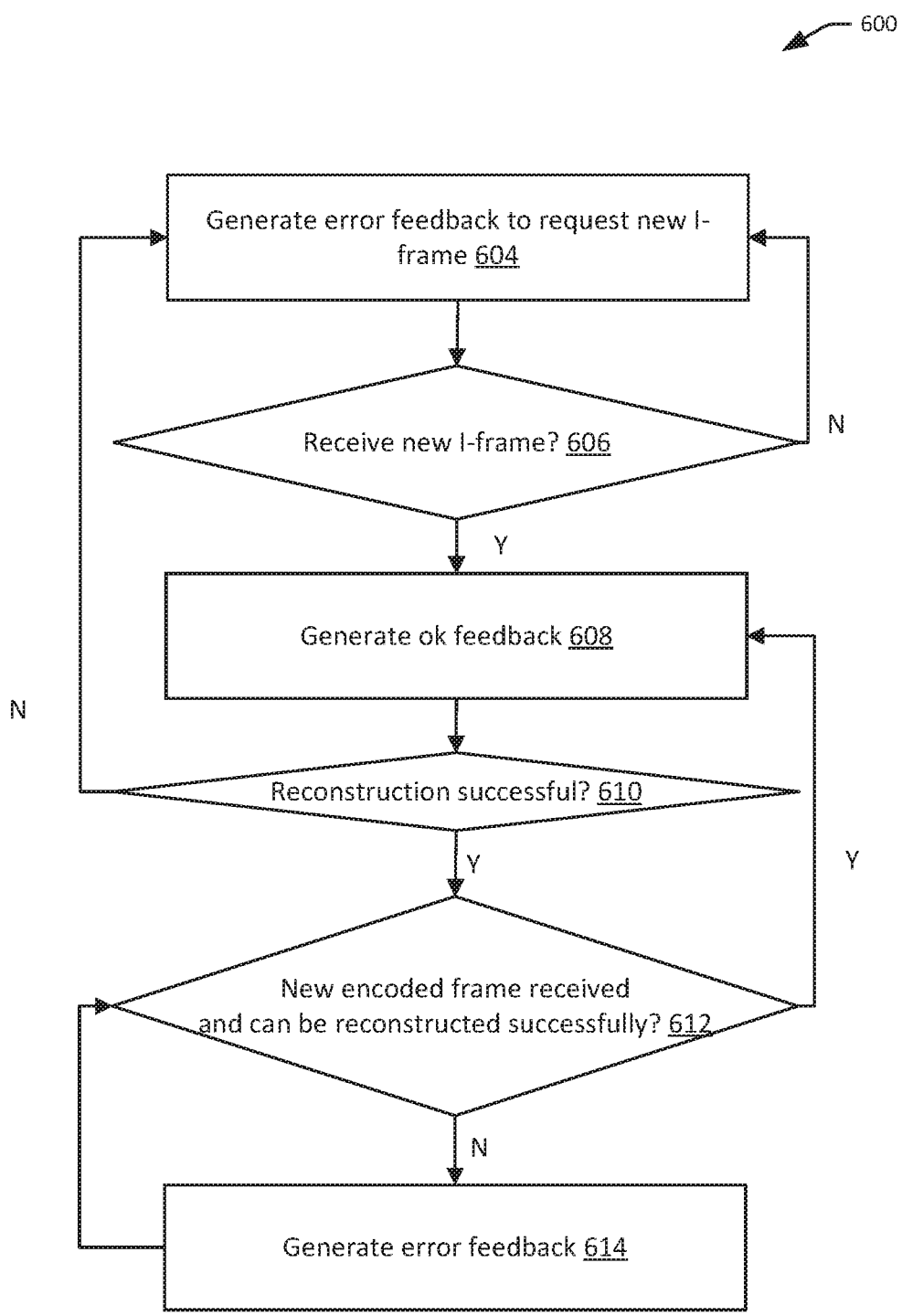
FIG. 6 illustrates another exemplary process for receiving data, in accordance with embodiments.

FIG. 6 illustrates another exemplary process 600 for receiving data, in accordance with embodiments. In some embodiments, the process 600 may be implemented by a receiver such as receiver 104 or 204 described in FIG. 1 or FIG. 2, respectively.

At block 604, an error feedback message is generated to request I-frame. This step may be performed when the receiver does not have any correctly reconstructed frames such as when the receiver initially starts up. In some embodiments, the receiver may initialize the receiver context information. For example, the reference frame list may be initially empty. Since the receiver does not have any reference frame to start with, an intraframe encoded frame is needed. In some embodiments, the feedback message may include a status indicator that indicates error. The frame identifier in the feedback message, if any, can be set to null to indicate that there is no correctly reconstructed reference frame.

At block 606, it is determined whether a new frame is received and whether it is an intraframe encoded frame, as requested at block 604. In some embodiments, metadata included with the encoded frame can be checked that the frame's type is an I-frame (e.g., based on a frame type in the metadata). and that the frame has not been previously received (e.g., based on a frame identifier in the metadata). Such metadata can be used without decoding the frame to expedite the verification/decoding process.

If it is determined at block 606 that a new frame is not an I-frame, then the process 600 loops back to block 604 to request a new I-frame. Similarly, if a new frame is not received within a predetermined amount of time, then the process 600 loops back to block 604 to request an I-frame. Otherwise, if it is determined at block 606 that a new I-frame is received correctly, then the process 600 proceeds to block 608. In some embodiments, the received I-frame may be verified for data integrity using metadata (e.g., CRC, frame length) associated with the encode frame.

At block 608, an ok feedback message is generated and transmitted to the transmitter. The ok feedback message can include a status indicator of the feedback message can be set to OK and the frame identifier can be set to the frame identifier of a previously correctly reconstructed frame, if any. Note that a feedback message is generated and transmitted to the receiver before the received frame is decoded to expedite error recovery. The feedback message can be generated based on verification of metadata associated with the encoded data without decoding.

At block 608, the received frame is decoded and it is determined whether the decoding is successful. If an encoding error is detected, then the process 600 loops back to block 604 to generate an error feedback message that indicates the error. Otherwise, the process 600 proceeds to block 612.

At block 612, it is determined whether a new encoded frame has been received and whether the frame can be reconstructed. Note that as used here, the phrase "can be reconstructed" means that the frame is capable of being reconstructed successfully assuming no decoder error. A frame that can be reconstructed may or may not be actually reconstructed. If so, then the process 600 loops back to block 608 to generate a corresponding ok feedback message. Otherwise, the process 600 proceeds to block 614.

In some embodiments, determining whether a new frame is received can include checking that the frame identifier of a newly received frame (which may be part of the metadata such as a header) has not been received before. In some embodiments, a missing frame can be detected by detecting a "gap" in the identifiers of recently received frames. Or, the missing frame can be detected when a predetermined amount of time has expired since when the last frame was received. In some embodiments determining whether a new frame is received includes checking whether all packets containing encoded data for the new frame have been received.

In some embodiments, determining whether the received frame can be reconstructed can include checking whether the following conditions are satisfied. First, the frame is received correctly (e.g., no transmission error). This may be verified by checking the metadata (e.g., CRC, data length) associated with the received data. Where the encoded frame is transmitted in multiple packets, all packets must be received without error. Second, if the received frame is a long-term P-frame, then the long-term reference frame used to encode the P-frame must have been reconstructed successfully and is in the reference frame list at the receiver. In some embodiments, the metadata associated with the received data may be used to determine the type of the received frame and/or the reference frame used to encode the received frame without decoding the received frame. Third, if the received frame is a short-term P-frame, then the short-term reference frame used to encode the P-frame must have been reconstructed successfully. The short-term reference frame may or may not have been added to the reference frame list.

At block 614, if no new frame is received or if a received frame cannot be reconstructed successfully, then an error feedback message is generated and transmitted to the transmitter. For example, a status indicator of the feedback message can be set to an error code and the frame identifier can be set to the frame identifier of a previously correctly reconstructed frame.

In some embodiments, blocks 612 and 614 can be repeated until a new frame received and can be successfully reconstructed. If not, multiple error feedback messages may be sent during this time with the same frame identifier.

Figure 7:
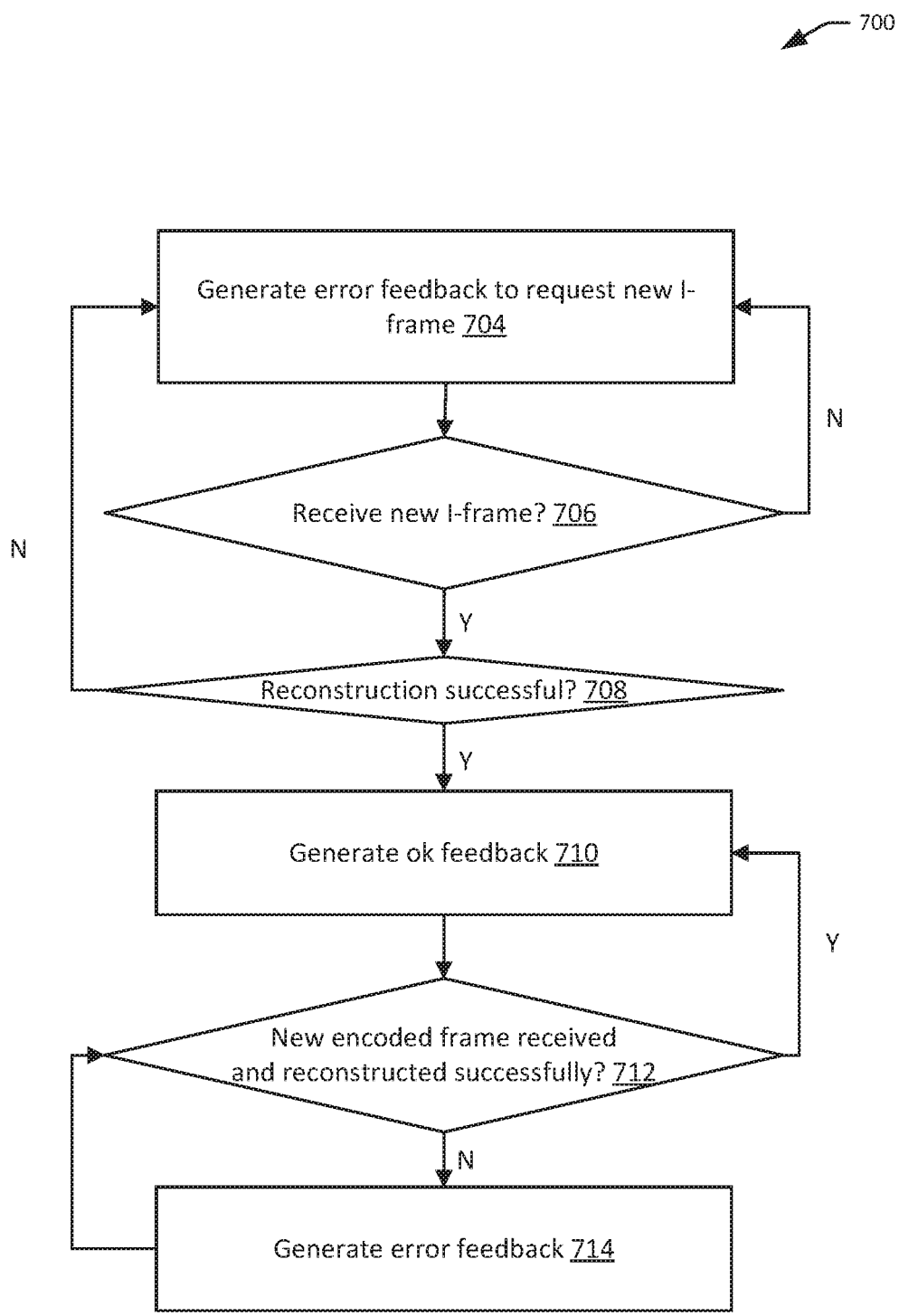
FIG. 7 illustrates another exemplary process for receiving data, in accordance with embodiments.

FIG. 7 illustrates another exemplary process 700 for receiving data, in accordance with embodiments. In some embodiments, the process 700 may be implemented by a receiver such as receiver 104 or 204 described in FIG. 1 or FIG. 2, respectively.

At block 704, an error feedback message is generated to request I-frame. This step may be performed when the receiver does not have any correctly reconstructed frames such as when the receiver initially starts up. In some embodiments, the receiver may initialize the receiver context information. For example, the reference frame list may be initially empty. Since the receiver does not have any reference frame to start with, an intraframe encoded frame is needed. In some embodiments, the feedback message may include a status indicator that indicates error. The frame identifier in the feedback message, if any, can be set to null to indicate that there is no correctly reconstructed reference frame.

At block 706, it is determined whether a new frame is received and whether it is an intraframe encoded frame, as requested at block 604. In some embodiments, metadata included with the encoded frame can be checked that the frame's type is an I-frame (e.g., based on a frame type in the metadata). and that the frame has not been previously received (e.g., based on a frame identifier in the metadata). Such metadata can be used without decoding the frame to expedite the verification/decoding process.

If it is determined at block 706 that a new frame is not an I-frame, then the process 700 loops back to block 704 to request a new I-frame. Similarly, if a new frame is not received within a predetermined amount of time, then the process 700 loops back to block 704 to request an I-frame. Otherwise, if it is determined at block 706 that a new I-frame is received, then the process 700 proceeds to block 708.

At block 708, the received I-frame is decoded and it is determined whether reconstruction of the frame based on the decoding is successful. If it is, then the process 700 proceeds to block 710. Otherwise, the process 700 proceeds to 704 to request an I-frame.

At block 710, an ok feedback message is generated and transmitted to the transmitter. The ok feedback message reflects the fact that a new frame is received and reconstructed successfully. For example, a status indicator of the feedback message can set to OK and the frame identifier can be set to the frame identifier of the correctly reconstructed frame.

At block 712, it is determined whether a new encoded frame has been received and correctly reconstructed. If so, then the process 700 loops back to block 710 to transmit a corresponding ok feedback message. Otherwise, the process 700 proceeds to block 714.

At block 714, an error feedback message is generated and transmitted to the transmitter. The feedback message reflects the fact that a new frame is not received or the new frame is not reconstructed successfully. For example, a status indicator of the feedback message can set to an error code and the frame identifier can be set to the frame identifier of a previously correctly reconstructed frame. Blocks 712 and 714 can be repeated until a new frame is successfully decoded. For example, multiple feedback messages may be sent during this time with the same frame identifier.

In contrast to process 600, where the encoded data is first checked for reconstructability and corresponding feedback messages are sent before the received data is actually decoded, here the reconstructability check is omitted and the encoded data is directly decoded. In some cases, process 700 may be used for receiving data that has no or little metadata (e.g., header/tail) useful for data verification before decoding.

Figure 8:
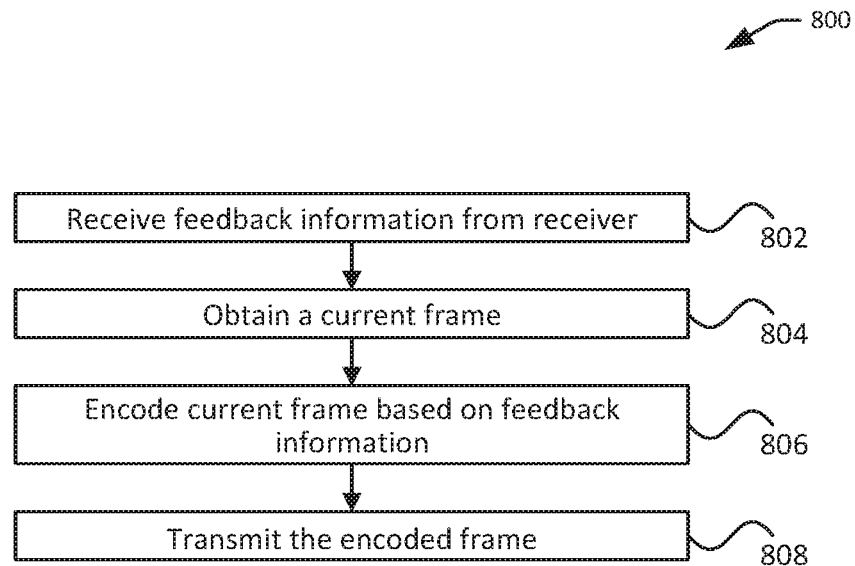
FIG. 8 illustrates another exemplary process for transmitting data, in accordance with embodiments.

FIG. 8 illustrates another exemplary process 800 for transmitting data, in accordance with embodiments. In some embodiments, the process 800 may be implemented by a transmitter such as transmitter 102 or 202 described in FIG. 1 or FIG. 2, respectively.

At block 802, feedback information from a receiver is received. For instance, a feedback message can be received. The feedback message can be processed to extract feedback information. In various embodiments, feedback information can be transmitted at fixed or variable intervals as described elsewhere herein. In some embodiments, the feedback information can include a status indicator, which indicates whether an error (e.g., transmission error, decoding error, software/hardware failure) has been detected at the receiver. The value of the status indicator can indicate an occurrence and/or the type of an error. The feedback information can also include a frame identifier that identifies a frame that has been correctly received and/or decoded at the receiver.

At block 804, a current frame is obtained. For example, the current frame can be obtained from an image acquisition device or system (e.g., a camera) configured to capture one or more video frames or still images. The image acquisition system may be carried by a movable object such as UAV.

At block 806, the current frame is encoded based at least in part the feedback information. In some embodiments, a suitable error recovery mechanism is selected based on the feedback information. An error recovery mechanism can be used to prevent error in one frame to propagate to subsequent frames. For example, an error recovery mechanism can involve intraframe encoding a subsequent frame or interframe coding the frame using only a previously correctly received frame, such as identified by the frame identifier in the feedback information.

In some embodiments, the feedback information can be used to select a coding mode from a plurality of coding modes, for encoding the current frame. In some embodiments, if the feedback information indicates that no error is detected, then the current frame can be encoded using a reference frame immediately preceding the current frame. That is, the current frame can be encoded under the short-term interframe coding mode. If the feedback information indicates error, and the reference frame identified in the feedback information is still available in the reference frame list, then the reference frame can be used to interframe encode the current frame. Thus, the current frame is encoded under the long-term interframe coding mode. Otherwise, if the feedback information does not include a valid frame reference identifier or if the reference frame is no longer in the reference frame list (e.g., when the reference frame list is not empty but does not include the reference frame list or when the reference frame list is empty), then the current frame can be intraframe encoded. That is, the current frame can be encoded under the intraframe coding mode.

Figure 9:
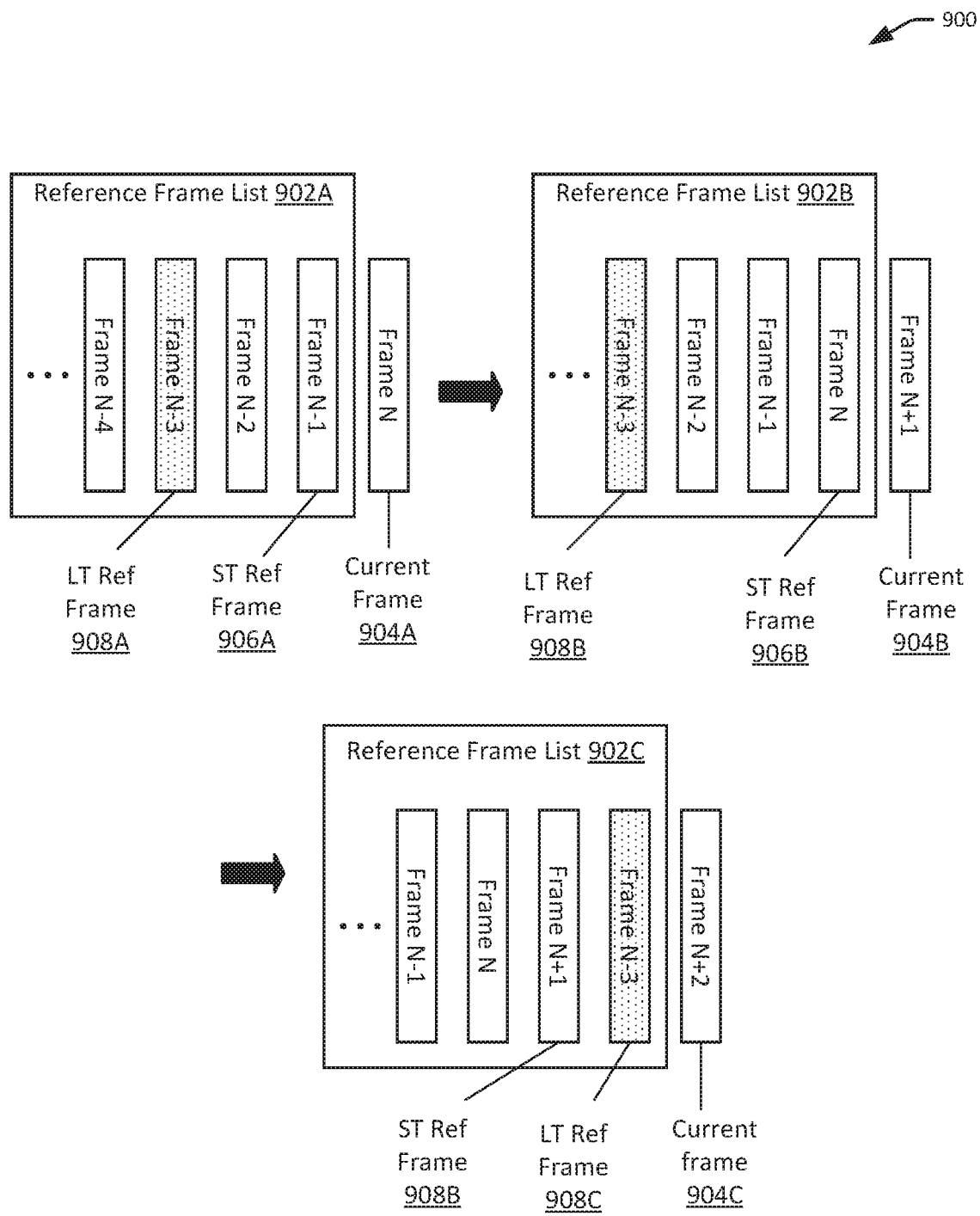
FIG. 9 illustrates an exemplary process for managing a reference frame list, in accordance with embodiments.

In some embodiments, the encoding process utilizes and/or updates the transmitter context information such as a reference frame list. FIG. 9 illustrates an exemplary process 900 for managing a reference frame list, in accordance with embodiments. Aspects of the process 900 may be implemented by a transmitter or a receiver. For example, aspects of the process 900 may be implemented by a transmitter context management module 120 of the transmitter 102 or a receiver context management module 134 of the receiver 104 described in FIG. 1.

The reference frame list can include previously frames that have been successfully encoded (e.g., for a transmitter) or decoded (e.g., for a receiver). The reference frame list can be managed using a first-in-first-out (FIFO) sliding window mechanism. The maximum window size may be predetermined (e.g., 2, 4, 8, 10, 16, 24, 32). The minimum window size may be 0 or a non-zero number. The window size can be configurable by a user or a system administrator. In some cases, the window size may be dynamically adjusted, e.g., based on the current channel condition, specific use case requirement, and the like. In the illustrated embodiment, new frames are added to the head of the list on the right and old frames are removed from the tail of the list on the left. Thus, by default, a short-term reference frame of a current frame is always at the head of the list. In some examples, the index for the head of the list is 0 and the indices for subsequent elements of the list increase. In some embodiments, the head of the list is used for interframe encoding a frame (e.g., by an encoder) or decoding a frame (e.g., by a decoder). Since the short-term reference frame is typically the most similar to the current frame, coding efficiency is maximized. However, under certain circumstances, a long-term reference frame may be moved to the head of the list to encode or decode a current frame when it is determined that the intervening frames may not have been reliably received.

A short-term reference frame of a current frame is the frame that immediately precedes the current frame, temporally. For example, in a system where the frames are assigned monotonically increasing frame identifiers as time goes on with an increment of 1, the short-term reference frame for frame N is frame N−1 (where N is an integer greater than 0). And the short-term reference frame for frame N+1 is frame N, and so on. A long-term reference frame is any frame temporally preceding the short-term reference frame. For example, frames N−2 and N−3 can be long-term reference frames for frame N.

As illustrated in FIG. 9, in the reference frame list 902A, frame N−1 is the short-term reference frame (also referred to as "ST ref frame") 906A, and frame N−3 is a long-term reference frame (also referred to as "LT ref frame") 908A for the current frame N 904A. Thus, the short-term reference frame N−1 is at the head of the reference frame list (e.g., with an index of 0) and used to encode the current frame N 904A by a transmitter or used to decode the current frame N 904A by a receiver.

If no error feedback is received from the receiver, then the sliding window is advanced forward such that in the updated reference frame list 902B, frame N 906B becomes the head of the list (e.g., with an index of 0) and the short-term reference frame for the next current frame N+1 904B. If the advancement of the sliding window causes the size of the list to exceed the maximum window size, the oldest frame on the list (i.e., the leftmost frame) may be removed. Thus, the short-term reference frame N is used to encode the now current frame N+1 904B by the transmitter/or used to decode the now current frame N+1 904B by the receiver.

If error feedback is received from the receiver, then the next current frame N+2 904C may need to be encoded (by the transmitter) and decoded (by the receiver) using a long-term reference frame N−3 908C that has been received and/or decoded correctly at the receiver. For instance, the frame N−3 may be identified in the feedback message received from the receiver. The long-term reference frame N−3 908C may be moved to the head of the reference frame list 902C, e.g., after the sliding window is advanced forward to include the frame N+1. Thus, the head of the list, long-term reference frame N−3 (e.g., with an index of 0), is used to encode the current frame N+2 904C by the transmitter or used to decode the current frame N+2 904C by the receiver. Alternatively, any frame (e.g., frame N−4) that temporally precedes the reference identified by the feedback message (e.g., frame N−3) may be used as the long-term reference frame.

In some embodiments, the reference frame list may be cleared when a current frame needs to be intraframe encoded to generate an I-frame. An I-frame may be required in various situations as described herein.

Referring back to block 806 of FIG. 8, in some embodiments, the current frame can be encoded based on a difference, $T_{diff}$ (a non-negative integer), between the current frame identifier and a reference frame identifier indicated in the feedback information and/or based on whether the reference frame is in the reference frame list. In some embodiments, if the status indicator of the feedback information indicates an error, and the $T_{diff}$ is greater than or equal to a predetermined threshold, $T_{th}$ (a non-negative integer), and the reference frame is available in the reference frame list, then reference frame is used to encode the current frame. If the reference frame is a long-term reference frame, then in some implementations, the long term reference frame may be moved to the head of the reference frame list before it is used to encode the current frame, such as described in FIG. 9.

If the status indicator of the feedback information indicates an error, and the $T_{diff}$ is greater than or equal to $T_{th}$, and the reference frame is not available in the reference frame list, then the current frame is intraframe encoded to obtain an I-frame. The long-term P frames and I-frames are transmitted in response to receiver error and can be considered error recovery frames. The transmission of I-frames and the transmission of long-term P-frames can be considered different error recovery mechanisms. Otherwise, if the feedback indicates success or if the $T_{diff}$ is equal or less than $T_{th}$, then the current frame may be interframe encoded using a short-term reference frame to obtain a short-term P frame. Compared with error recovery frames, short-term interframe encoded frames can improve encoding quality and promote efficient channel usage.

In some cases, such as when the feedback transmission interval is relatively long, the receiver error may already be recovered, but the feedback message (reflecting the recovered status) may not be received by the transmitter until later on. During this time, the transmitter may be configured to transmit one or more unnecessary error recovery frames (e.g., I-frames and long-term P frames), reducing the overall efficiency of the error recovery mechanism of the communication system. Compared with short-term P frames, the error recovery frames typically provide less coding efficiency, encoding quality, and less efficient channel usage. It is therefore desirable to limit the amount of unnecessary error recovery frames that are transmitted wherever possible. The use of the threshold $T_{th}$ can serve this purpose. $T_{th}$ can represent a threshold time period expressed in the intervening frames. For example, if the current frame rate is 24 frames per second, then if $T_{th}=6$, the time interval represented by $T_{th}$ is 0.25 second. In an embodiment, $T_{th}$ can be set to a value that represent an interval that is the same as or longer than the sum of the current feedback transmission interval (i.e., the interval at which feedback messages are transmitted from the receiver) and the transmission time or delay for the feedback message. For example, if 6 frames are typically obtained and/or transmitted by the transmitter during such an interval, then $T_{th}$ may be set to 7 or 8. The current feedback transmission interval may be fixed, or dynamically determined by the transmitter and/or the receiver. For example, the receiver may inform the transmitter of the current feedback transmission interval. In some embodiments, the transmission time used to determine $T_{th}$ may be calculated based on the transmission time of one or more recently received feedback messages (e.g., an average, a maximum, a minimum). the transmission time of a feedback message may be calculated based on a timestamp associated with the feedback message.

In some embodiments, the value of $T_{th}$ can be determined based on the intervals between recently received feedback messages. For instance, $T_{th}$ can be set to be larger than an average, a maximum, or a minimum of the intervals between two or more most recently received feedback messages. For example, if on average, 8 frames are obtained or transmitted by the transmitter between when adjacent feedback messages are received, then $T_{th}$ may be set to be 8 or a higher value of 9 or 10.

The above discussion also applies to alternative embodiments where the values for $T_{diff}$ and $T_{th}$ represent actual time (e.g., in seconds, milliseconds, microseconds) instead of number of intervening frames. In such embodiments, $T_{diff}$ can be determined by comparing the time the current frame is obtained and the time when the reference frame was obtained. And the value of $T_{th}$ may be determined to be longer than the feedback transmission interval plus transmission delay.

In some embodiments, $T_{th}$ may be set be the same as or a slightly higher value than $T_f$, the interval (expressed as a number of intervening frames or time) between arrivals of adjacent feedback messages. A first value is slightly higher than a second value if the first value no more than 50%, 40%, 30%, 20%, or 10% higher than the second value. In some other embodiments, $T_{th}$ may be set be more than 50% higher than $T_f$. For example, $T_{th}$ may exceed $T_f$ by be 60%, 80%, 100%, 150%, 200%, 300%, 500%, or more.

Alternatively or additionally, the encoding of the current frame can be based on a condition or an environment at the transmitter. For instance, an I-frame may be required in various situations. When an I-frame is required, the reference frame list may be cleared. For example, an I-frame may be required when there is an encoder error, such as stream buffer overflow, encoder hardware failure, and the like. As another example, an I-frame may be required when there is a change in resolution or bitrate at the encoder. In some embodiments, the transmitter can be configured to adjust the resolution and/or bitrate of the transmitted frames to match a current condition of the communication channel and/or a use case. For example, when the channel capacity is abundant, the transmitter may be configured to transmit frames with higher resolution and bitrate. Conversely, when the channel capacity is scarce, the transmitter may be configured to transmit frames with lower resolution and bitrate. As another example, when a receiver application requires a higher resolution, the transmitter may be configured to transmit frames with higher resolution and bitrate; and vice versa. In some embodiments, a rate controller such as the rate controller 118 of FIG. 1 may be configured to adjust one or more coding parameters (e.g., quantization parameter) for the encoder to achieve the desired resolution/bitrate.

At block 808, the encode frame is transmitted to the receiver. In some embodiments, metadata about the encoded data useful for verification and/or decoding can be packaged with the encoded data prior to transmission.

Figure 10:
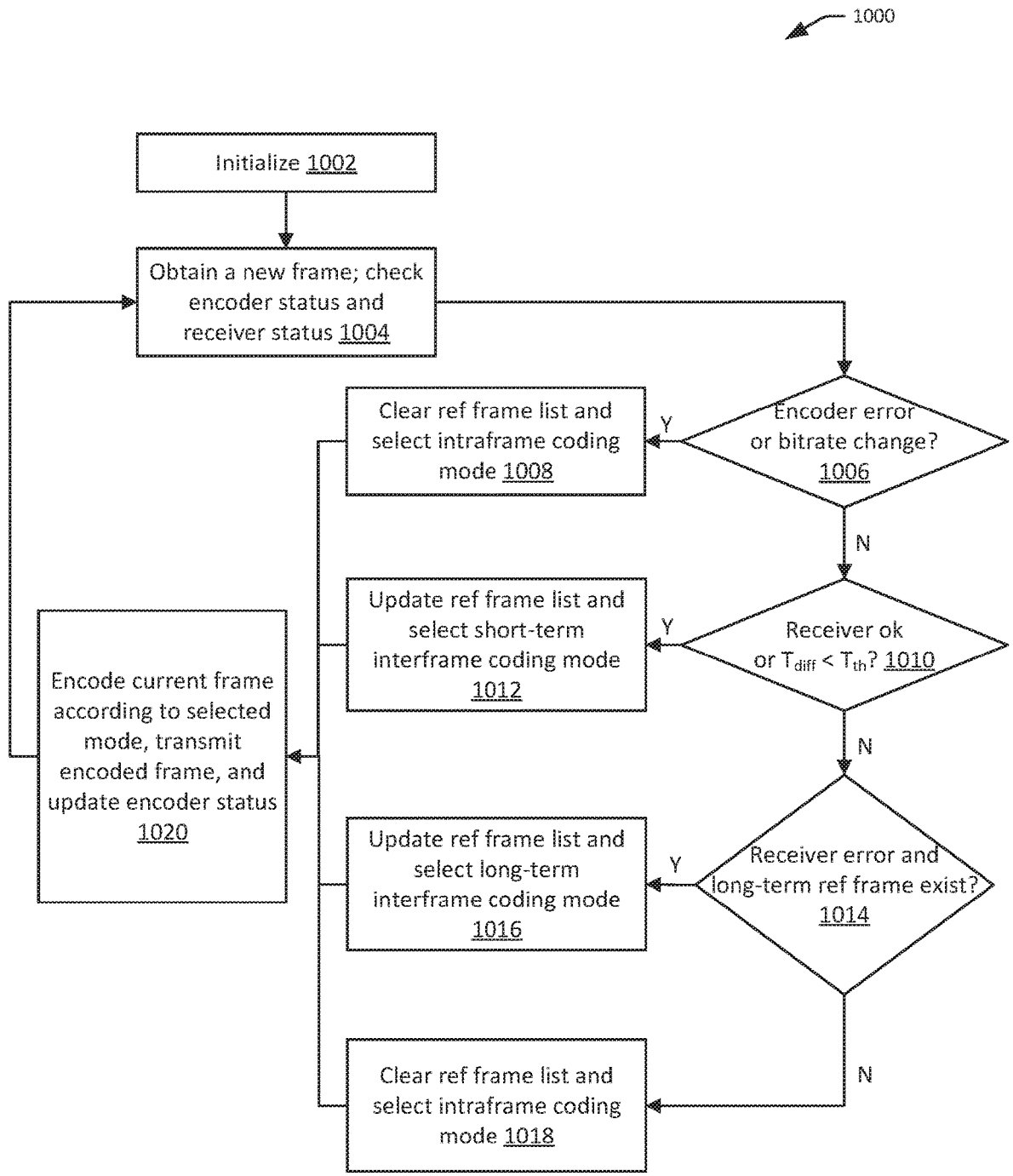
FIG. 10 illustrates another exemplary process for transmitting data, in accordance with embodiments.

FIG. 10 illustrates another exemplary process 1000 for transmitting data, in accordance with embodiments. In some embodiments, the process 1000 may be implemented by a transmitter such as transmitter 102 or 202 described in FIG. 1 or FIG. 2, respectively.

At block 1002, the transmitter is initialized. The initialization of the transmitter can include initializing the reference frame list (e.g., empty). The transmitter can be configured to initialize after starting up and/or after in response to a feedback message from the receiver. The feedback message may be similar to the one transmitted at block 604 of FIG. 6 or block 704 of FIG. 7.

At block 1004, the next frame to be encoded is obtained. The next frame may be a frame from of a stream of images produced by an image acquisition module such as a video camera or camera. Additionally, a status of an encoder and/or a status of the receiver can be determined. The encoder status can indicate whether there is an error with the encoder or whether the encoder is functioning properly. The receiver status may be determined based on a previously-received feedback message from the receiver.

At block 1006, it is determined whether there is an encoder error or a bitrate change. As discussed herein, in some embodiments, the transmitter can be configured to adjust the bitrate/resolution of the transmitted image stream based on a condition of the communication channel and/or requirements for specific scenarios. If it is true that there is an encoder error or a bitrate change, then the process 1000 proceeds to block 1008, where the reference frame list is emptied and an intraframe coding mode is selected for encoding the current frame. Otherwise, the process 1000 proceeds to block 1010.

At block 1010, it is determined whether the receiver status is ok or whether the difference between a current frame identifier and a reference frame, $T_{diff}$ is less than the predetermined threshold value, $T_{th}$. The receiver status can be determined based on a feedback message received from the receiver. $T_{th}$ may be determined using based on any of the various factors described elsewhere herein.

If the condition at block 1010 is satisfied, then the process 1000 proceeds to block 1012, where the reference frame list is updated and a short-term interframe mode is selected for encoding the current frame. The reference frame may be updated using a sliding window mechanism, such that the short-term reference frame is used for encoding the current frame, for example, by inserting the short-term reference frame at the head of the reference frame list. As discussed elsewhere herein, the default coding mode can be set to short-term interframe coding when there is no receiver error, so as to improve efficiency associated with the encoding process and with channel usage. Additionally, the more efficient short-term interframe coding mode can be used by default between adjacent feedback messages to avoid transmission of redundant error recovery frames.

If the condition at block 1010 is not satisfied, then the process 1000 proceeds to block 1014, where it is determined whether there is a receiver error and whether a long-term reference frame exists in the reference frame list at the transmitter. The receiver error can be indicated by a feedback message and the long-term reference frame may be identified in the feedback message. The long-term reference frame identifier can be used to determine whether it still exists in the receiver reference frame list, which may be updated using a sliding window mechanism.

If the condition at block 1014 is satisfied, then the process 1000 proceeds to block 1016, where a long-term interframe coding mode is selected for encoding the current frame. Thus, the error recovery frame is a long-term P frame when the long-term reference frame is available. Such P-frames can be encoded more efficiently (e.g., less bitrate and channel bandwidth) than I-frames, the other type of error recovery frames.

If the condition at block 1014 is not satisfied, then the process 1000 proceeds to block 1018, where an intraframe coding mode is selected for encoding the current frame. Thus, in some examples, the transmission of I-frames is limited to only those occasions when long-term and short-term P frames cannot be used and I-frames are required. This improves coding efficiency and channel utilization.

At block 1020, the current frame is encoded according to the coding mode selected above. Additionally, the encoded frame can be transmitted and the encoder status can be updated, for example, to reflect whether there is encoder error. Blocks 1004 to 1020 may be repeated for each subsequent frame.

Figure 11:
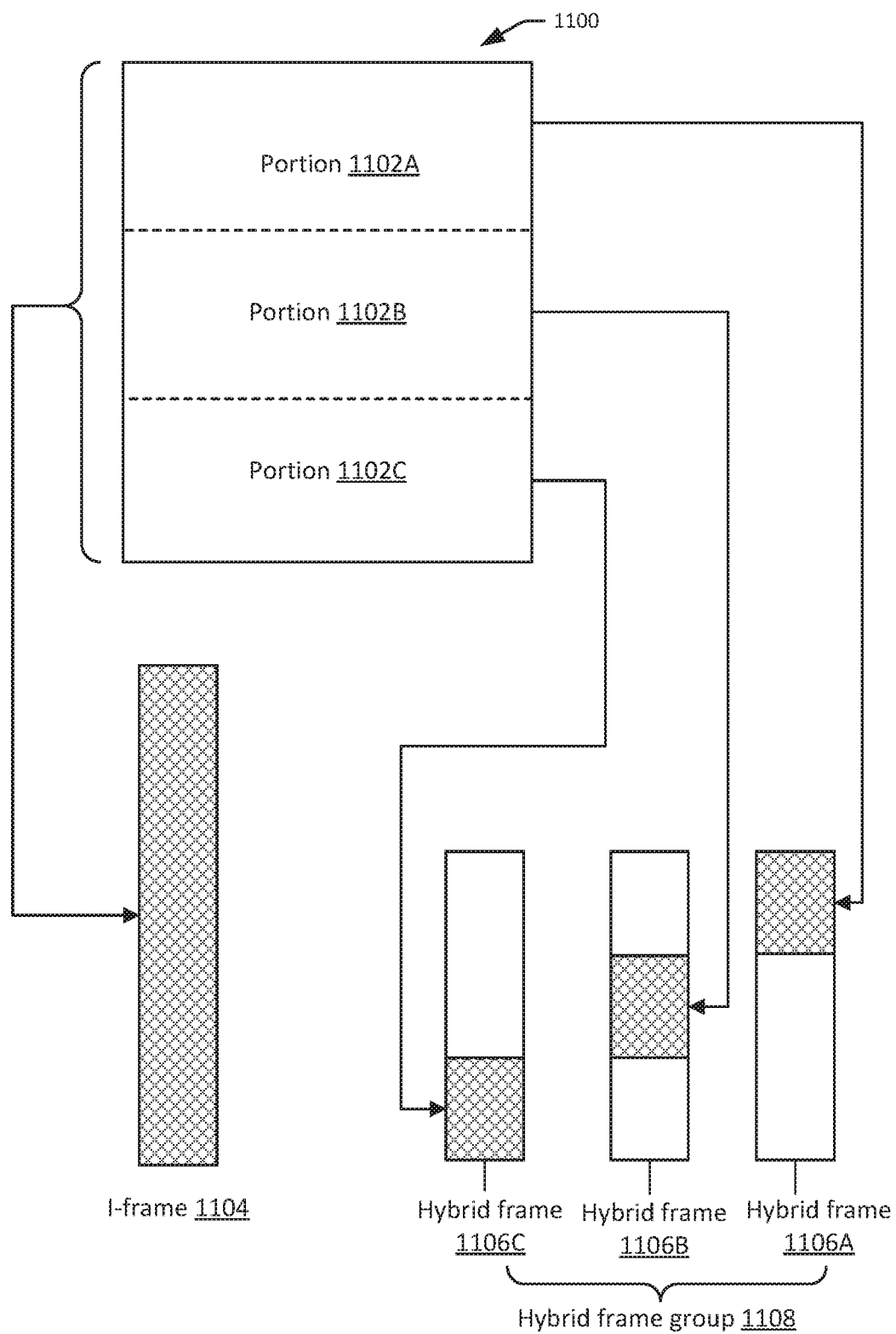
FIG. 11 illustrates exemplary processes for encoding a frame, in accordance with embodiments.

Variation of the embodiments described herein is also within the scope of the present disclosure. For example, instead of intraframe encoding a frame to generate one I-frame, a plurality of hybrid frames can be generated wherein each of hybrid frames intraframe encodes a different portion of the original frame. FIG. 11 illustrates exemplary processes for encoding a frame 1100, in accordance with embodiments. Under a traditional intraframe coding mode, the entire frame 1100 can be encoded to produce an I-frame 1104. The advantage of intraframe encoding the entire frame is that once the I-frame is received, it can be used to reconstruct the entire frame without relying on any other frames. However, the bits or bitrate required to intraframe encode the entire frame can be much higher than that required for encoding P-frames. Therefore, the transmission of I-frames can cause the undesirable bitrate fluctuation, higher peak-to-average ratio, and longer latency.

An alternative approach can be used to alleviate some of the problems of using I-frames. The frame to be encoded 1100 can be divided into a plurality of different portions 1102A, 1102B, 1102C. It is understood that the portions shown are for illustrative purposes only and not intended to be limiting. In other embodiments, the frame may comprise more or less than three portions. A plurality of hybrid frames can be generated comprising a hybrid frame 1106A, 1106B, 1106C respectively corresponding to the portions 1102A, 1102B, and 1102C of the original frame 1100. The hybrid frames can form a group 1108 that correspond to the original frame 1100. Each hybrid frame within the hybrid frame group contains an intraframe encoded portion (shaded) which is the result of intraframe encoding a corresponding portion of the original frame. The remainder of the hybrid frame may comprise the result of interframe encoding the rest of the original frame. Using the hybrid frame 1106A as an example, hybrid frame 1106A comprises an intraframe encoded portion (shaded) resulting from intraframe encoding portion 1102A. Hybrid frame 1106B comprises an intraframe encoded portion (shaded area) resulting from intraframe encoding portion 1102B. And hybrid frame 1106C comprises an intraframe encoded portion (shaded area) resulting from intraframe encoding portion 1102C.

Since only a portion of the original frame is intraframe encoded and remainder is interframe encoded, the bitrate required to encode the hybrid frame is lower than that required to encode an I-frame. Therefore, problems of bitrate fluctuation, high peak-to-average ratio, and long transmission delays can be alleviated compared the transmission of I-frames. Such an approach may be especially suitable for low-latency systems. However, the drawbacks of this alternative approach is that all hybrid frames within the hybrid frame group need to be received correctly before the original frame can be successfully reconstructed, thereby prolonging the error recovery process.

In various embodiments, a hybrid frame group can be used in places where an I-frame is used. For example, on the transmitter side, instead of generating and transmitting an I-frame (e.g., when there is an encoder error, when there is a bitrate change, when the long-term reference frame does not exist in the reference frame), the transmitter can be configured to generate and transmit a group of hybrid frames. Each of the hybrid frames can be associated with metadata similar to the metadata for an I-frame, except the type of the frame is a hybrid frame instead of an I-frame. The metadata may also indicate the intraframe encoded portion in the encoded hybrid frame and/or how the relationship between the hybrid frames within a hybrid frame group. On the receiver side, instead of verifying that an I-frame is correctly received and/or decoded, the receiver can be configured to verify that all hybrid frames within a hybrid frame group are received correctly. Instead of decoding an I-frame, the decoder can be configured to decode the hybrid frames within the hybrid frame group to reconstruct the original frame.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
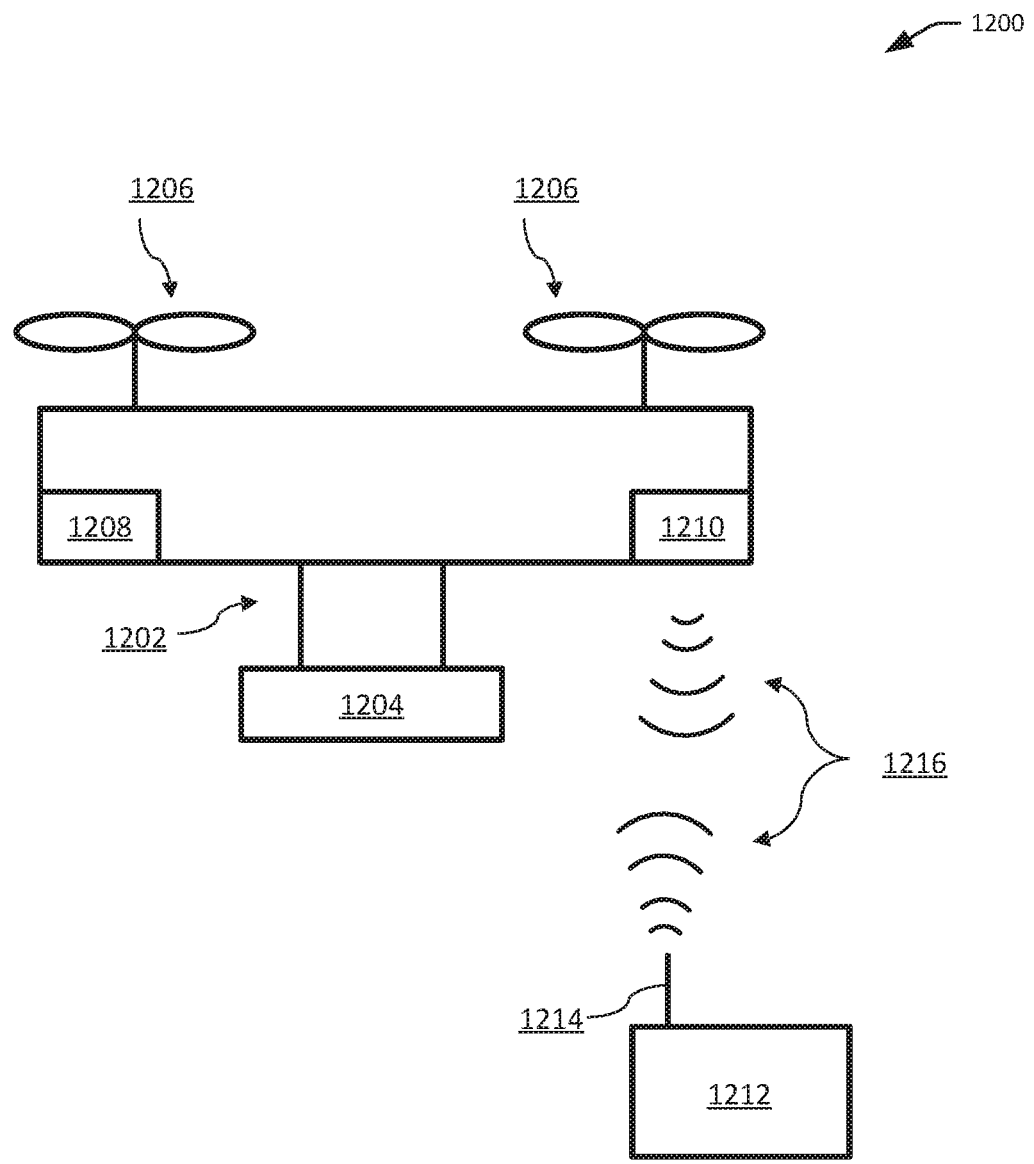
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1206 may be controlled independently of the other propulsion mechanisms. Alternatively, the propulsion mechanisms 1206 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication; such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1214, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
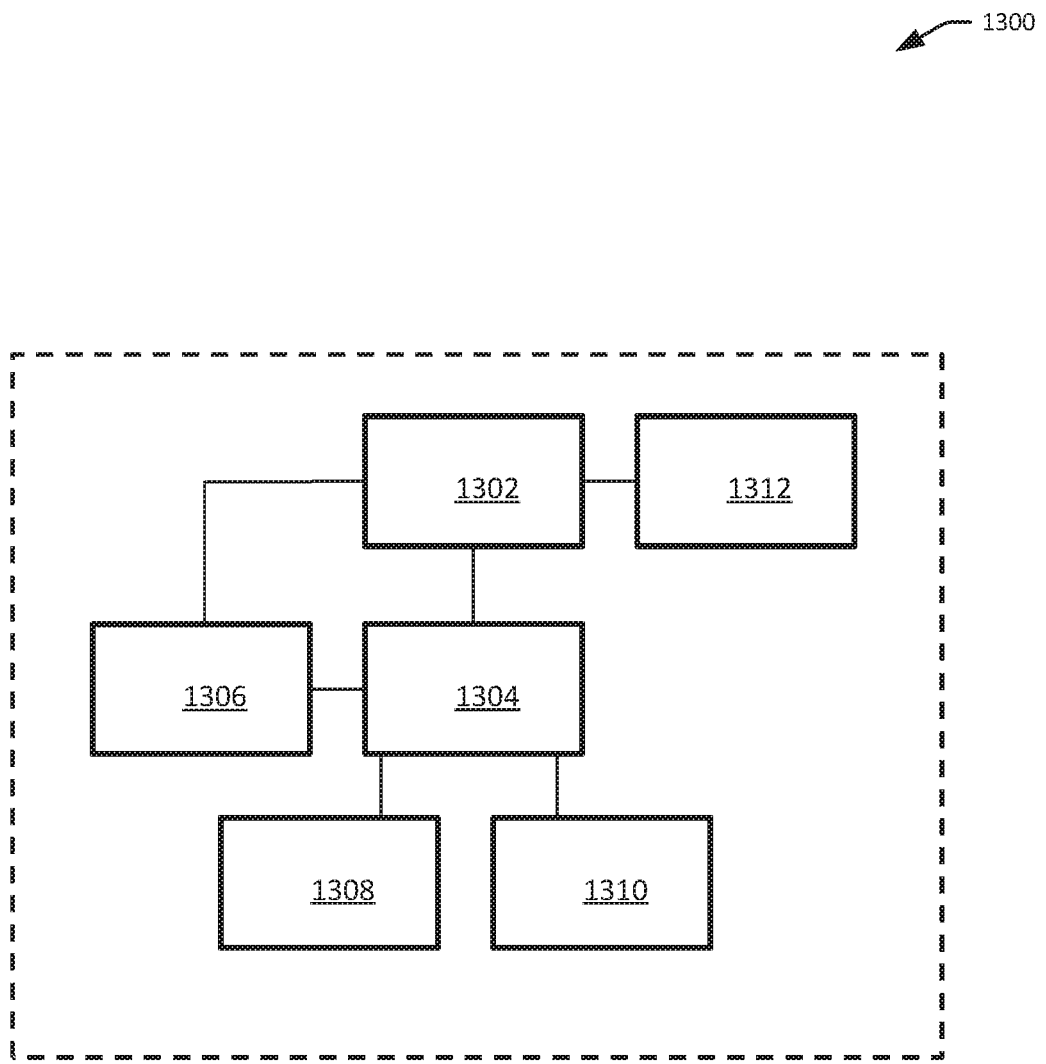
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable or non-programmable processor (e.g., a central processing unit (CPU), a microprocessor, an FPGA, an application-specific integrated circuit (ASIC)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method, comprising:
receiving, from a receiver of image data, a feedback message comprising feedback information, the feedback information including a reference frame identifier associated with a reference frame that has been correctly received by the receiver;
obtaining a current frame to be encoded;
encoding the current frame based at least in part on the feedback information, including:
determining a difference between a current frame identifier associated with the current frame and the reference frame identifier; and
encoding the current frame based at least in part on a comparison between the difference and a predetermined threshold; and
transmitting the encoded current frame to the receiver wherein the current frame is interframe encoded using a short-term reference frame in response to the difference being less than the predetermined threshold and wherein the current frame is interframe encoded using the reference frame in response to the difference being equal to or greater than the predetermined threshold.

2. The method of claim 1, wherein the feedback information comprises a status indicator that indicates a receiving status with respect to the image data.

3. The method of claim 2, wherein encoding the current frame comprises selecting a coding mode from a plurality of coding modes comprising an intraframe coding mode, a short-term coding mode, and a long-term coding mode based at least in part on the status indicator.

4. The method of claim 1, wherein encoding the current frame comprises interframe encoding the current frame using the reference frame.

5. The method of claim 1, wherein the predetermined threshold is greater than an interval between adjacent feedback messages.

6. The method of claim 1, further comprising, prior to transmitting the encoded current frame to the receiver, packaging the encoded current frame with metadata.

7. The method of claim 6, wherein the metadata comprises at least one of an identifier of the current frame, a type of the encoded current frame, a reference frame offset, or an error-detection code.

8. A computer system, comprising:
a memory that stores one or more computer-executable instructions; and
one or more processors configured to access the memory and execute the computer-executable instructions to perform a method comprising:
receiving, from a receiver of image data, a feedback message comprising feedback information, the feedback information including a reference frame identifier associated with a reference frame that has been correctly received by the receiver;
obtaining a current frame to be encoded;
encoding the current frame based at least in part on the feedback information including:
determining a difference between a current frame identifier associated with the current frame and the reference frame identifier; and
encoding the current frame based at least in part on a comparison between the difference and a predetermined threshold; and
transmitting the encoded current frame to the receiver wherein the current frame is interframe encoded using a short-term reference frame in response to the difference being less than the predetermined threshold and wherein the current frame is interframe encoded using the reference frame in response to the difference being equal to or greater than the predetermined threshold.

9. The computer system of claim 8, wherein the feedback information comprises a status indicator that indicates a receiving status with respect to the image data.

10. The computer system of claim 9, wherein encoding the current frame comprises selecting a coding mode from a plurality of coding modes comprising an intraframe coding mode, a short-term coding mode, and a long-term coding mode based at least in part on the status indicator.

11. The computer system of claim 8, wherein encoding the current frame comprises interframe encoding the current frame using the reference frame.

12. The computer system of claim 8, wherein the predetermined threshold is greater than an interval between adjacent feedback messages.

13. The computer system of claim 8, wherein the method further comprises packaging metadata with the encoded current frame prior to transmitting the packaged data to the receiver.

14. One or more non-transitory computer-readable storage media storing computer executable instructions that, when executed by a computing system, configure the computing system to perform a method comprising:
receiving, from a receiver of image data, a feedback message comprising feedback information, the feedback information including a reference frame identifier associated with a reference frame that has been correctly received by the receiver;
obtaining a current frame to be encoded;
encoding the current frame based at least in part on the feedback information including:
determining a difference between a current frame identifier associated with the current frame and the reference frame identifier; and
encoding the current frame based at least in part on a comparison between the difference and a predetermined threshold; and
transmitting the encoded current frame to the receiver wherein the current frame is interframe encoded using a short-term reference frame in response to the difference being less than the predetermined threshold and wherein the current frame is interframe encoded using the reference frame in response to the difference being equal to or greater than the predetermined threshold.

* * * * *